United States Patent
Maeda et al.

(10) Patent No.: US 9,596,382 B2
(45) Date of Patent: Mar. 14, 2017

(54) IMAGE FORMING APPARATUS CAPABLE OF CUSTOMIZING OPERATION SCREEN BASED ON PERSONAL SETTING INFORMATION AND METHOD FOR CONTROLLING IMAGE FORMING APPARATUS

(71) Applicant: CANON KABUSHIKI KAISHA, Tokyo (JP)

(72) Inventors: Ryo Maeda, Moriya (JP); Daiji Kirihata, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/747,154

(22) Filed: Jun. 23, 2015

(65) Prior Publication Data

US 2015/0373216 A1  Dec. 24, 2015

(30) Foreign Application Priority Data

Jun. 24, 2014 (JP) ................................ 2014-129576

(51) Int. Cl.
*H04N 1/00* (2006.01)
*H04N 1/44* (2006.01)

(52) U.S. Cl.
CPC ......... *H04N 1/4426* (2013.01); *H04N 1/4406* (2013.01)

(58) Field of Classification Search
CPC ........... H04N 1/00514; H04N 1/00411; H04N 1/00437; H04N 1/00517; H04N 1/00854; H04N 1/00931; H04N 1/4426; H04N 1/4406

USPC ........................................................ 358/1.14
See application file for complete search history.

(56) References Cited

U.S. PATENT DOCUMENTS

| | | | |
|---|---|---|---|
| 8,381,111 B2* | 2/2013 | Kawana | G03G 15/5075 101/494 |
| 2009/0128844 A1* | 5/2009 | Kondo | H04N 1/00244 358/1.15 |
| 2012/0200578 A1* | 8/2012 | Yamakawa | H04N 1/00 345/501 |
| 2014/0300920 A1* | 10/2014 | Hayashi | H04N 1/00413 358/1.14 |
| 2015/0007109 A1* | 1/2015 | Yun | H04N 1/0035 715/810 |
| 2015/0029539 A1* | 1/2015 | Kim | G06K 15/005 358/1.15 |

(Continued)

FOREIGN PATENT DOCUMENTS

JP    2003-345427 A    12/2003

*Primary Examiner* — Allen H Nguyen
(74) *Attorney, Agent, or Firm* — Canon USA, Inc. I.P. Division

(57) ABSTRACT

An image forming apparatus includes an obtaining unit that obtains personal setting information about a user who logs into the image forming apparatus from a server apparatus and a display control unit that controls a display unit to display a customized operation screen customized for the user based on the obtained personal setting information. If the personal setting information has been obtained from the server apparatus within a predetermined time, the customized operation screen is displayed. If the personal setting information has been obtained from the server apparatus after the predetermined time elapses, the customized operation screen is not displayed.

12 Claims, 20 Drawing Sheets

(56) References Cited

U.S. PATENT DOCUMENTS

2016/0191159 A1* 6/2016 Aoyama .............. H04N 21/436
                                                    398/172

* cited by examiner

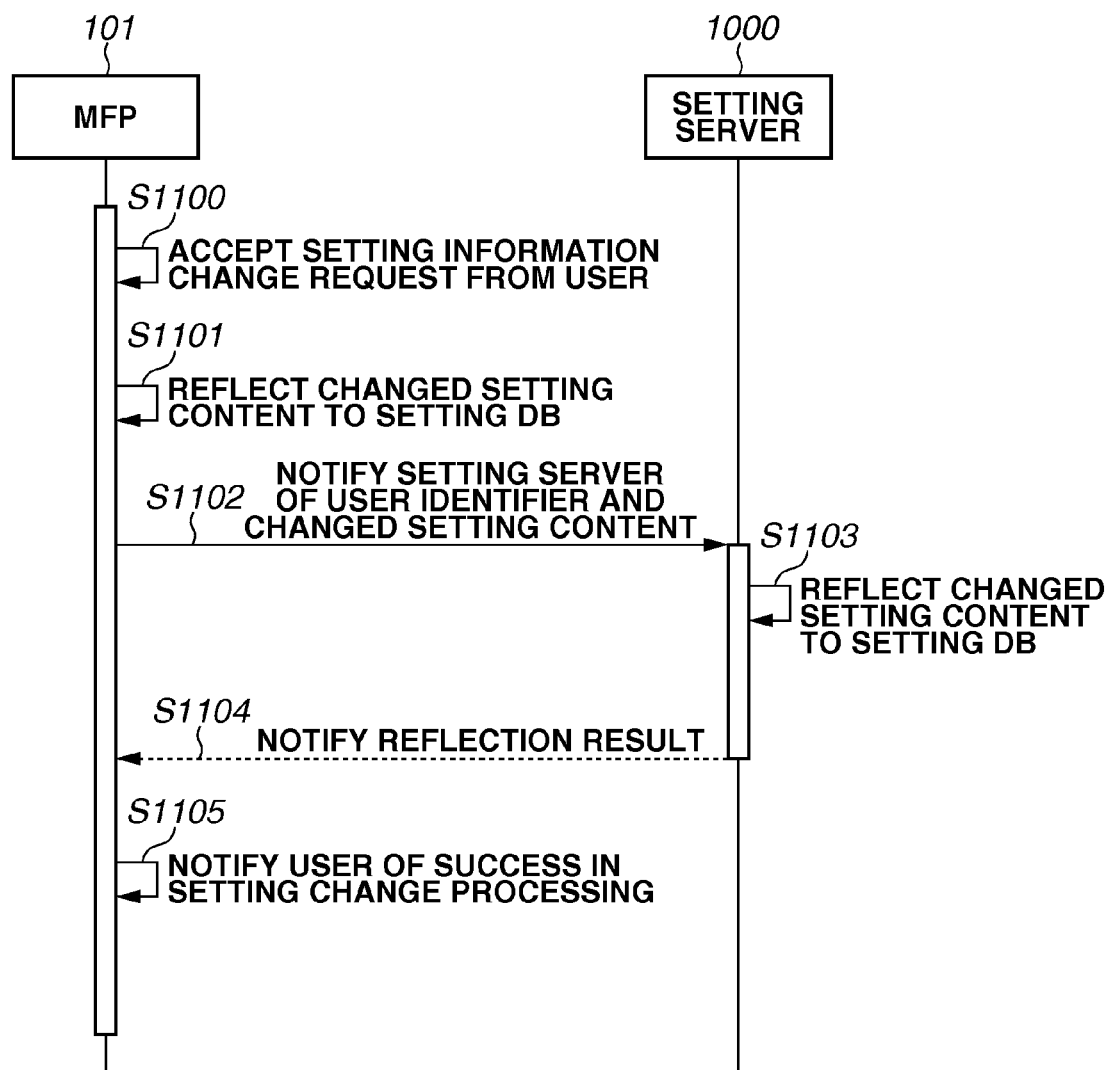

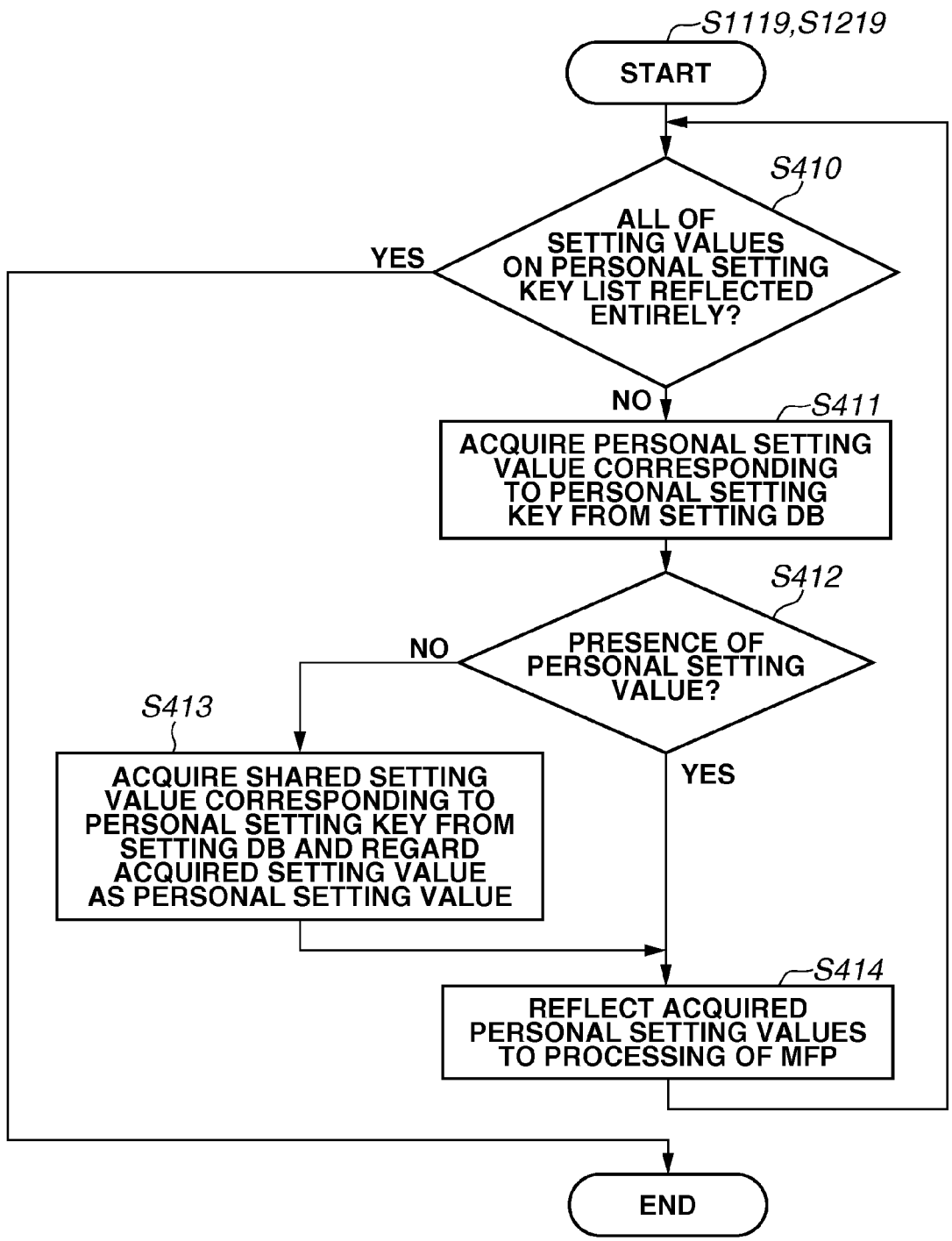

FIG.15

SETTING INFORMATION OWNED BY SETTING SERVER (6001)

| USER | DISPLAY LANGUAGE | INITIAL SCREEN | PRINT SETTING |
|---|---|---|---|
| A | JAPANESE | TOP MENU | NOTHING |
| B | ENGLISH | CUSTOM MENU | STAPLE |
| C | FRENCH | COPY | PUNCH |

SETTING INFORMATION OWNED BY MFP (6002)

| USER | DISPLAY LANGUAGE | INITIAL SCREEN | PRINT SETTING |
|---|---|---|---|
| A | JAPANESE | COPY | STAPLE |
| B | ENGLISH | TOP MENU | PUNCH |
| D | JAPANESE | BOX STORAGE | STAPLE |

SETTING INFORMATION OWNED BY SETTING SERVER AFTER REFLECTING MFP SETTING INFORMATION (6003)

| USER | DISPLAY LANGUAGE | INITIAL SCREEN | PRINT SETTING |
|---|---|---|---|
| A | JAPANESE | TOP MENU | STAPLE |
| B | ENGLISH | CUSTOM MENU | STAPLE |
| C | FRENCH | COPY | PUNCH |
| D | JAPANESE | BOX STORAGE | STAPLE |

SETTING INFORMATION OWNED BY MFP AFTER COMPLETING COOPERATIVE OPERATION BY MFP AND SETTING SERVER (6004)

| USER | DISPLAY LANGUAGE | INITIAL SCREEN | PRINT SETTING |
|---|---|---|---|
| A | JAPANESE | TOP MENU | STAPLE |
| B | ENGLISH | CUSTOM MENU | STAPLE |
| C | FRENCH | COPY | PUNCH |
| D | JAPANESE | BOX STORAGE | STAPLE |

FIG.18

SETTING INFORMATION OWNED BY MFP (9001)

| USER | DISPLAY LANGUAGE | INITIAL SCREEN | PRINT SETTING | LATEST UPDATE DATE AND TIME |
|---|---|---|---|---|
| A | JAPANESE | TOP MENU | NOTHING | 2014/04/01 15:00 |
| B | ENGLISH | CUSTOM MENU | STAPLE | 2014/04/01 16:00 |
| C | FRENCH | COPY | PUNCH | 2014/04/01 17:00 |

SETTING INFORMATION OWNED BY MFP (9002)

| USER | DISPLAY LANGUAGE | INITIAL SCREEN | PRINT SETTING | LATEST UPDATE DATE AND TIME |
|---|---|---|---|---|
| A | JAPANESE | COPY | STAPLE | 2014/04/01 18:00 |
| B | ENGLISH | TOP MENU | PUNCH | 2014/03/01 17:00 |
| D | JAPANESE | BOX STORAGE | STAPLE | 2014/03/01 16:00 |

SETTING INFORMATION OWNED BY SETTING SERVER AFTER REFLECTING MFP SETTING INFORMATION (9003)

| USER | DISPLAY LANGUAGE | INITIAL SCREEN | PRINT SETTING | LATEST UPDATE DATE AND TIME |
|---|---|---|---|---|
| A | JAPANESE | TOP MENU | NOTHING | 2014/04/01 15:00 |
| B | ENGLISH | CUSTOM MENU | STAPLE | 2014/04/01 16:00 |
| C | FRENCH | COPY | PUNCH | 2014/04/01 17:00 |

SETTING INFORMATION OWNED BY SETTING SERVER AFTER REFLECTING MFP SETTING INFORMATION (9004)

| USER | DISPLAY LANGUAGE | INITIAL SCREEN | PRINT SETTING | LATEST UPDATE DATE AND TIME |
|---|---|---|---|---|
| A | JAPANESE | COPY | STAPLE | 2014/04/01 18:00 |
| B | ENGLISH | CUSTOM MENU | STAPLE | 2014/04/01 16:00 |
| C | FRENCH | COPY | PUNCH | 2014/04/01 17:00 |
| D | JAPANESE | BOX STORAGE | STAPLE | 2014/03/01 16:00 |

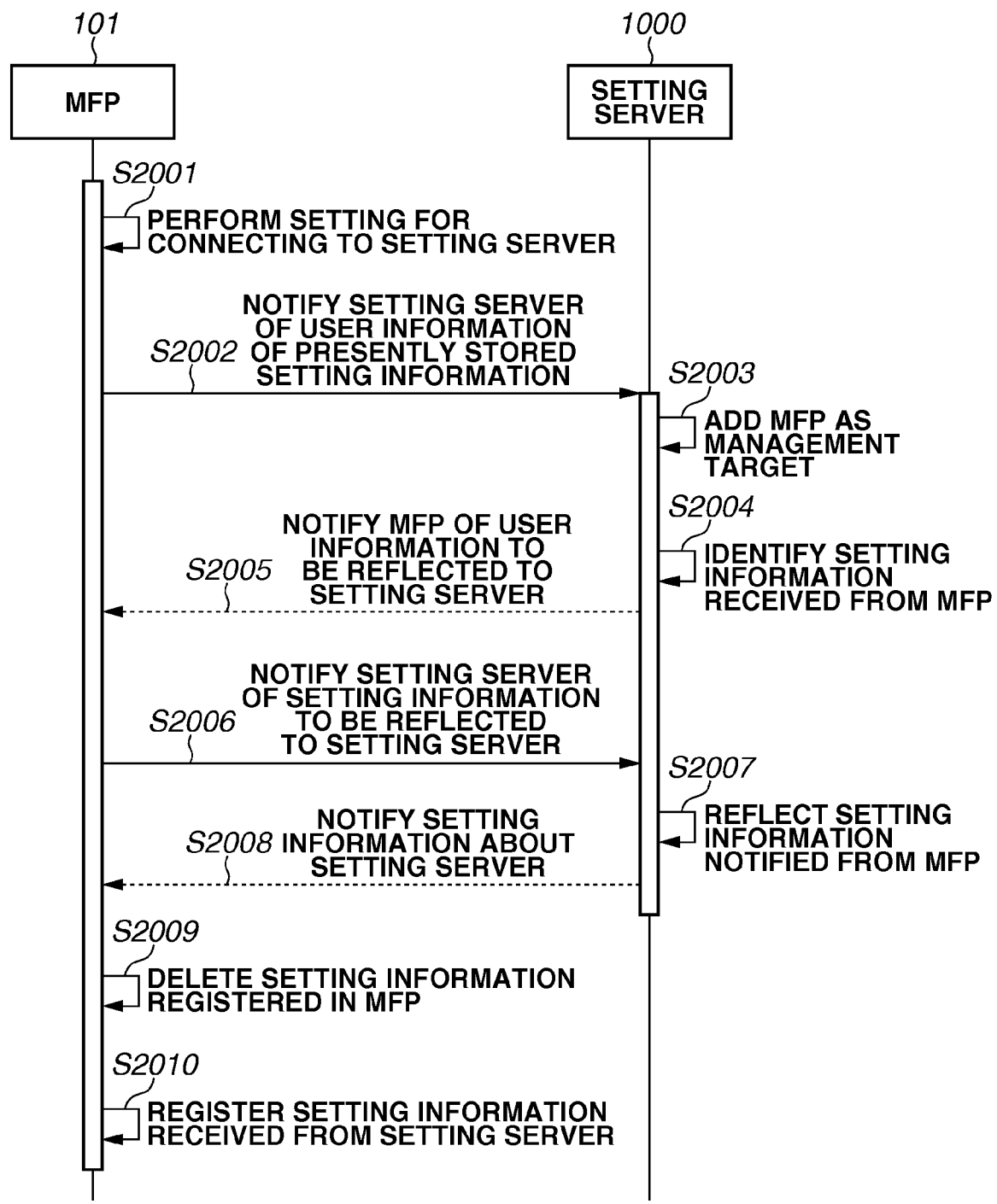

IMAGE FORMING APPARATUS CAPABLE OF CUSTOMIZING OPERATION SCREEN BASED ON PERSONAL SETTING INFORMATION AND METHOD FOR CONTROLLING IMAGE FORMING APPARATUS

BACKGROUND

Field

Aspects of the present invention generally relate to an image forming apparatus that can customize an operation screen based on personal setting information.

Description of the Related Art

In recent years, an advanced image forming apparatus has various functions and the contents of operations that can be performed by a user are complicated.

Generally, an image forming apparatus is shared among a plurality of users. Therefore, the functions available for the image forming apparatus include an auto-clear function of automatically clearing setting values, after the elapse of a predetermined time to prevent a next user from using changed setting values without being aware of the change if the setting values are changed by a user before the next user. According to the above-mentioned usage style, each user is required to select a desired setting screen from an initial menu every time the user operates the image forming apparatus. Therefore, even when the setting values ordinarily used by an individual user remain the same, the user is required every time to perform a troublesome operation for the determined settings.

For example, it is assumed that display language information initially set for an image forming apparatus is Japanese. In this case, it is necessary for a user who wants to use English language to initially change the setting value of the display language information from Japanese to English. Then, after the user uses a desired function with the display of English language, the user performs an operation to return the setting value of the display language information from English to Japanese.

In view of the foregoing, one of newly provided functions is a customization function of enabling a user to freely set initial setting values. According to the customization function, when a user performs a work for setting personal setting values, a system changes initial values or behaviors according to the designated personal setting values or permits only a registered user to use a shortcut function.

As discussed in Japanese Patent Application Laid-Open No. 2003-345427, there is a conventional technique capable of creating a personal environment customized for each individual user in real time by referring to a personal profile and providing the created personal environment to a user terminal apparatus.

According to the technique discussed in Japanese Patent Application Laid-Open No. 2003-345427, the personal environment is created in real time. Therefore, it may take a long time to complete the creation of the personal environment depending on an environment available to communicate with a server or specifications of the apparatus. On the other hand, there is a conventional method for creating a personal environment by using a cache held by a terminal apparatus, instead of creating the personal environment in real time. In this case, if the personal environment of the terminal apparatus is updated at the completion time of the process for providing the personal environment from the server to the terminal apparatus, there will be the possibility that a user feels as if the personal environment is suddenly switched.

SUMMARY

According to an aspect of the present invention, an image forming apparatus includes an obtaining unit configured to obtain personal setting information about a user who logs into the image forming apparatus from a server apparatus, and a display control unit configured to control a display unit to display a customized operation screen customized for the user based on the obtained personal setting information. If the personal setting information has been obtained from the server apparatus within a predetermined time, the display control unit causes the display unit to display the customized operation screen.

Further features of the present disclosure will become apparent from the following description of exemplary embodiments with reference to the attached drawings.

BRIEF DESCRIPTION OF THE DRAWINGS

FIG. 7 is a sequence diagram illustrating processing for synchronizing with a setting server in response to a change of setting information in the MFP.

FIG. 9 is a sequence diagram illustrating processing in a case where the synchronization processing has not been completed within the predetermined time.

FIG. 15 illustrates examples of the setting information.

FIG. 18 illustrates examples of the setting information.

FIG. 19 is a sequence diagram illustrating information processing for reflecting setting information (part III).

DESCRIPTION OF THE EMBODIMENTS

Hereinafter, exemplary embodiments will be described in detail below with reference to attached drawings.

Figure 1:
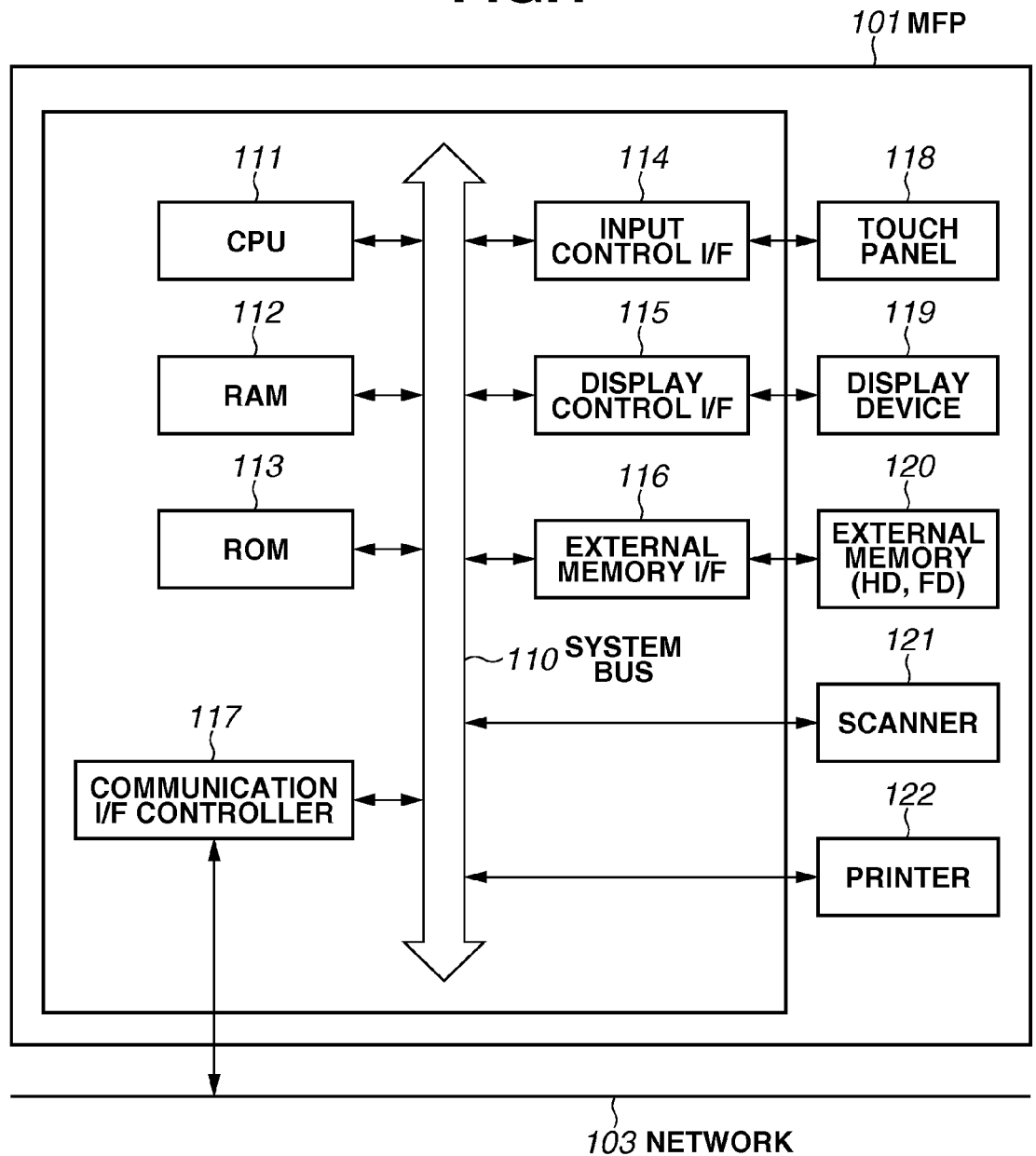
FIG. 1 illustrates a hardware configuration of a multi function peripheral (MFP).

A first exemplary embodiment will be described in detail bellow. FIG. 1 illustrates an example of the hardware configuration of a multi function peripheral (MFP) 101.

A central processing unit (CPU) 111, a random access memory (RAM) 112, a read only memory (ROM) 113, an input control I/F 114, a display control I/F 115, an external memory I/F 116, and a communication I/F controller 117 are connected to a system bus 110. Further, a scanner 121 and a printer 122 are connected to the system bus 110. Respective units connected to the system bus 110 are configured in such a way as to mutually transmit and receive data via the system bus 110.

The CPU 111 can control various operations to be performed by the MFP 101 and can perform data calculation and modification processing.

The RAM 112 is a volatile memory that can be used as a main memory or a temporary storage area (e.g., a work area) for the CPU 111.

The ROM 113 is a nonvolatile memory that includes predetermined areas capable of storing image data and other data, and various programs that cause the CPU 111 to perform various operations.

For example, the CPU 111 controls the remaining units of the MFP 101 according to the programs stored in the ROM 113 while using the RAM 112 as a work memory. The programs causing the CPU 111 to perform various operations can be stored not only in the ROM 113 but also in an external memory 120.

The input control I/F 114 can accept a user operation, generate a control signal according to the user operation, and supply the generated control signal to the CPU 111. For example, the input control I/F 114 is connected to a touch panel 118 and the like that serve as an input device that can accept user operations. For example, the touch panel 118 is an input device including a flat input plane that can detect a user's touch operation and output coordinate information about the touched position.

The CPU 111 controls respective units of the MFP 101 according to the programs, based on the control signals generated and supplied from the input control I/F 114 in response to user operations detected via the input device. Thus, the CPU 111 can cause the MFP 101 to perform various operations according to user operations. The display control I/F 115 can output a display signal that causes a display device 119 to display an image. For example, the CPU 111 supplies to the display control I/F 115 a display control signal generated according to a related program. The display control I/F 115 generates a display signal based on the display control signal and outputs the generated display signal to the display device 119. For example, the display control I/F 115 causes the display device 119 to display a GUI screen that constitutes a graphical user interface (GUI) based on the display control signal generated by the CPU 111.

The touch panel 118 can be integrated with the display device 119. For example, the touch panel 118 can be attached to the display device 119 in such a way as to constitute an upper layer of a display surface of the display device 119 without obstructing the display by the display device 119 due to transmission of light. An input coordinate position on the touch panel 118 can be correlated with a display coordinate position on the display device 119. Thus, the created GUI brings excellent user-friendliness as if a user can directly operate a screen displayed on the display device 119.

The external memory 120 (e.g., a hard disk drive (HDD), a flash memory, or a memory card) is attachable to the external memory I/F 116. Under the control of the CPU 111, the external memory I/F 116 can read data from the attached external memory 120 or can write data into the external memory 120. If desirable, the ROM 113 can be replaced by the external memory 120.

The communication I/F controller 117 can communicate with external devices via a local area network (LAN), the internet, or any other appropriate wired or wireless network, under the control of the CPU 111. A personal computer (PC), another MFP, a printer, a server, or any other device, which is connected to a network 103, can communicate with the MFP 101.

Under the control of the CPU 111, the scanner 121 can read an original document and can generate image data. For example, the CPU 111 can cause the scanner 121 to perform scan processing according to a user instruction input via the input control I/F 114. The scanner 121 can read an original document placed on a document positioning plate or an auto document feeder (ADF) and can generate digital image data. The scanner 121 can store the generated image data in the external memory 120 via the external memory I/F 116.

The printer 122 can perform print processing using image data stored in the external memory 120, under the control of the CPU 111. For example, the CPU 111 causes the printer 122 to perform print processing according to a user instruction input via the input control I/F 114 or a command instruction input from an external apparatus via the communication I/F controller 117. The printer 122 can read image data from the external memory 120 and convert the read image data into print-formatted data and perform an image printing operation on a paper medium.

When the CPU 111 performs processing based on the programs stored in the ROM 113 or the external memory 120, a software configuration of the MFP 101 and processing to be performed by the MFP 101 according to flowcharts described in detail below can be realized.

Figure 2:
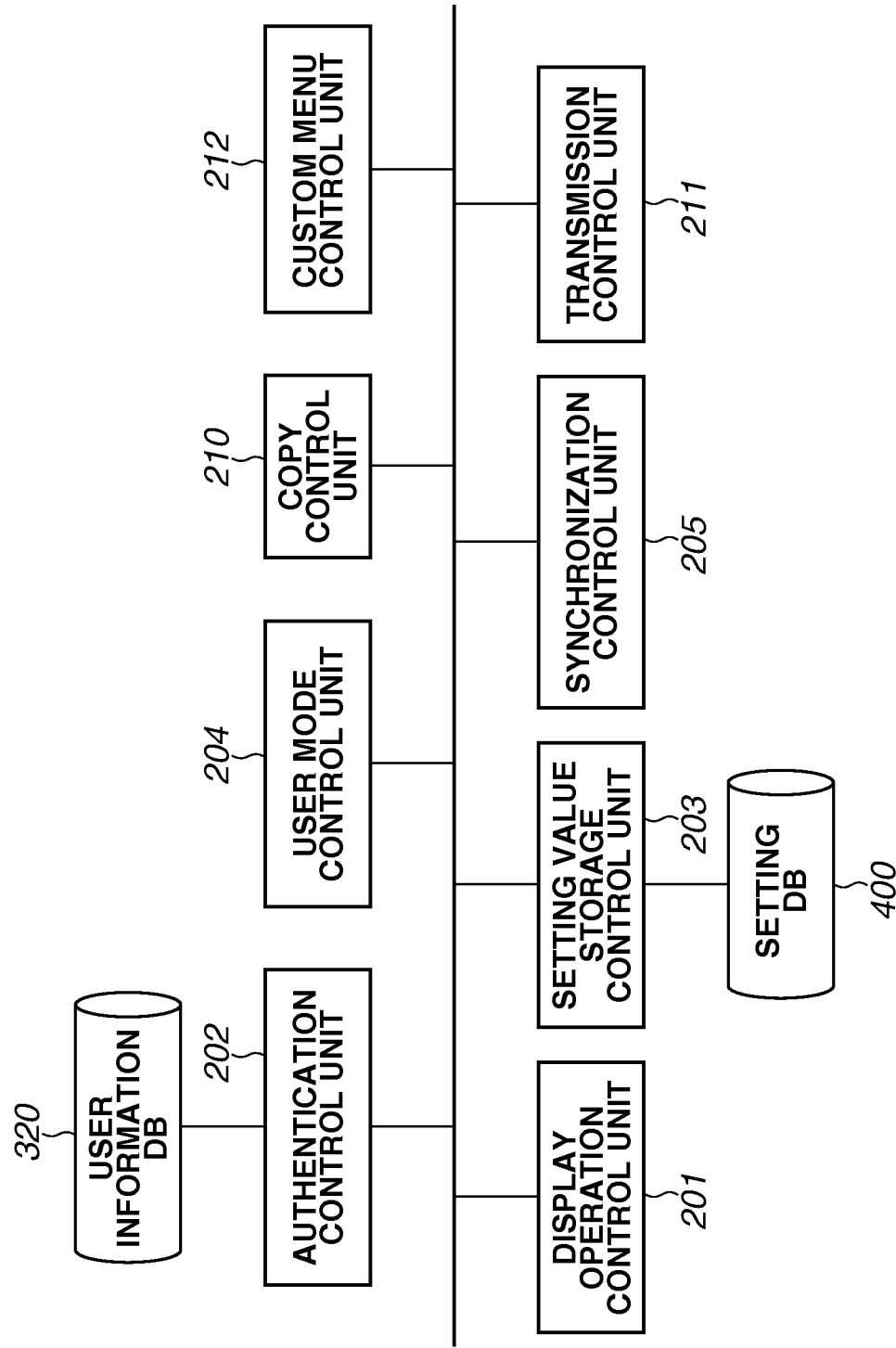
FIG. 2 illustrates a software configuration of the MFP.

FIG. 2 illustrates an example of the software configuration of the MFP 101.

The MFP 101 is operable according to at least one function (hereinafter, referred to as "Function"). The MFP 101 includes a plurality of control units that are dedicated to different Functions. According to the software configuration illustrated in FIG. 2, the MFP 101 includes a copy control unit 210, a transmission control unit 211, and a custom menu control unit 212. The MFP 101 can include an additional control unit dedicated to any Function relating to the processing of the MFP 101 in addition to the control units illustrated in FIG. 2. For example, the MFP 101 can include a control unit dedicated to SecurePrint Function i.e., a function of storing a print job entered by a driver in the MFP 101 and performing a printing operation for only an authenticated user or a user who knows a password associated with a print job. Further, the MFP 101 can include control units dedicated to Box Function (i.e., a function of storing image data in the MFP 101), Help Function (i.e., a function of displaying a help screen), and FAX Function (i.e., a function of receiving a FAX document via a public communication network).

A display operation control unit 201 can control the input control I/F 114 and the display control I/F 115. For example, the display operation control unit 201 can cause the display device 119 to display an image via the display control unit I/F 115 based on an instruction from another control unit. Further, the display operation control unit 201 can acquire information input by a user on the touch panel 118 via the input control I/F 114.

An authentication control unit 202 can perform authentication (hereinafter, referred to as "login") processing to identify each individual user. In other words, the authentication control unit 202 determines whether an operator of the MFP 101 is an authorized user of the MFP 101. Further, the authentication control unit 202 can control a database (hereinafter, referred to as user information DB 320) that stores user information on the external memory 120.

Figure 3:
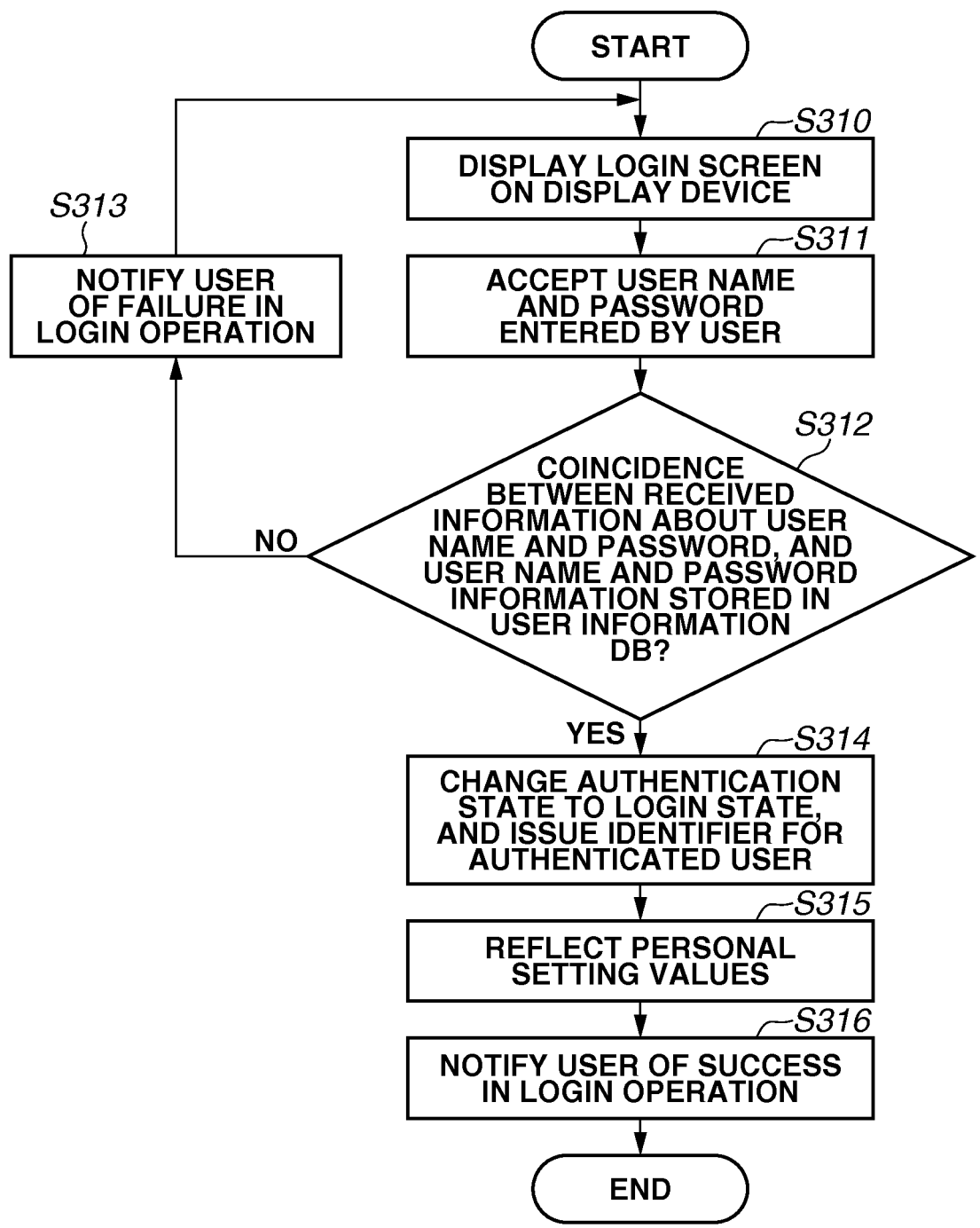
FIG. 3 is a flowchart illustrating login related information processing that can be performed by an authentication control unit.

FIG. 3 is a flowchart illustrating an example of information processing that can be performed by the authentication control unit 202 in response to a user's login instruction. The authentication control unit 202 transmits a request for the following processing to each control unit.

In step S310, the display operation control unit 201 displays a login screen 300 on the display device 119. In step S311, the display operation control unit 201 accepts a user name and a password entered via the display control I/F 115 if the user performs input processing via the touch panel 118. In step S312, the authentication control unit 202 receives the user name and the password input in step S311 from the display operation control unit 201 and checks if the received information about the user name and the password coincides with a user name and password information stored in the user information DB 320. If no coincidence has been confirmed (No in step S312), then in step S313, the authentication control unit 202 determines that the login operation has been failed and notifies the user of the failure in the login operation via the display operation control unit 201. The operation returns to the login reception state in step S310. If the coincidence has been confirmed with respect to the user name and the password (Yes in step S312), then in step S314, the authentication control unit 202 determines that the authentication processing has been successfully completed and changes the authentication state from a non-login state to a login state. Further, the authentication control unit 202 issues an identifier usable for uniquely identifying each individual user (hereinafter, referred to as "user identifier 321"). In step S315, the authentication control unit 202 performs personal setting value reflection processing via a setting value storage control unit 203. Details of the processing to be performed in step S315 will be described in detail below. In step S316, the authentication control unit 202 notifies the user of success in the login operation via the display operation control unit 201 and terminates the login processing of the flowchart illustrated in FIG. 3.

The authentication method is not limited to the above-mentioned example. For example, another authentication method (e.g., contactless IC card) is employable. Further, for example, using an external authentication server (e.g., Active Directory (AD)) capable of performing authentication processing is useful because it is unnecessary to provide the user information DB 320 in the MFP 101. In this case, the authentication control unit 202 requests the external authentication server to perform authentication processing via the communication I/F controller 117. Further, the CPU 111 can be configured to selectively switch between the user information DB 320 in the MFP 101 and an external authentication server according to an operation via the touch panel.

Figure 4:
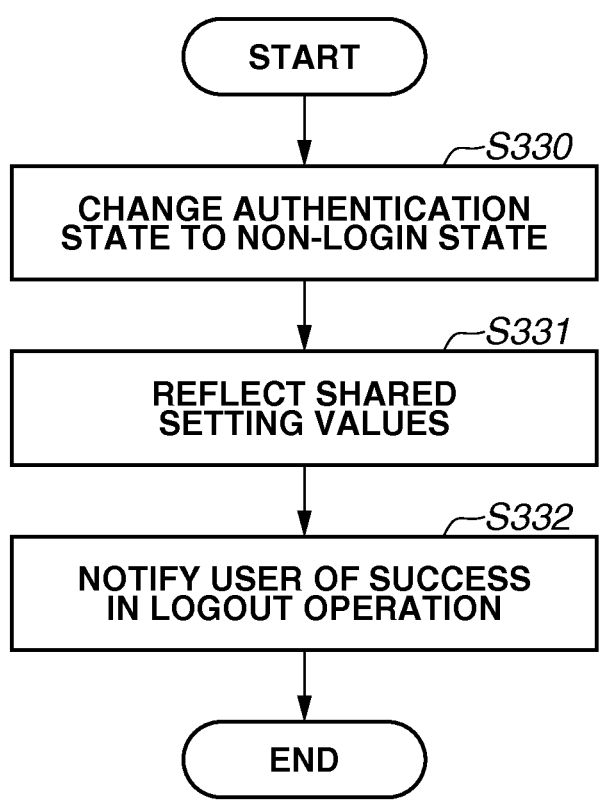
FIG. 4 is a flowchart illustrating logout related information processing that can be performed by the authentication control unit.

Shifting from the login state to the non-login state is referred to as "logout." FIG. 4 is a flowchart illustrating an example of the information processing that can be performed by the authentication control unit 202 in response to a user's logout instruction. The authentication control unit 202 transmits a request for the following processing to each control unit. If the display operation control unit 201 accepts a logout request from a user via the touch panel 118, then in step S330, the display operation control unit 201 changes the authentication state from the login state to the non-login state. In step S331, the authentication control unit 202 performs setting value reflection processing via the setting value storage control unit 203. Details of the processing to be performed in step S331 will be described in detail below. In step S332, the authentication control unit 202 notifies the user of success in the logout operation via the display operation control unit 201 and terminates the logout processing of the flowchart illustrated in FIG. 4.

Further, the authentication control unit 202 provides a user registration/deletion function and a user information update function. In addition, the authentication control unit 202 provides a group function. Each group is composed of a plurality of users. The authentication control unit 202 can register a plurality of groups. Each user can belong to at least one group. There may be a user who does not belong to any group. The authentication control unit 202 provides a group registration/deletion function and a group information update function. The authentication control unit 202 is further capable of causing a user to belong to a group or withdraw from a group.

The information in the user information DB 320, which can be stored by the authentication control unit 202, includes an identifier that uniquely identifies each individual user (hereinafter, referred to as "user identifier 321") and an identifier that uniquely identifies each group (hereinafter, referred to as "group identifier 322").

The information in the user information DB 320, which can be stored by the authentication control unit 202, includes information about which group each individual user belongs to.

Next, the setting value storage control unit 203 will be described in detail below. The setting value storage control unit 203 is a control unit configured to store shared setting information, personal setting information, and group setting information. The shared setting information can be referred to by all users. The personal setting information can be referred to by each individual user. The group setting information can be referred to by users belonging to each group. More specifically, if "Japanese" is set as the display language setting value of the shared setting information, the environment for all users can be displayed by using "Japanese" language. If "English" is set as the display language setting value of the personal setting information, the environment for a target user can be displayed by using "English" language. If "Chinese" is set as the display language setting value of the group setting information, the environment for users belonging to a target group can be displayed by using "Chinese" language.

Figure 5:
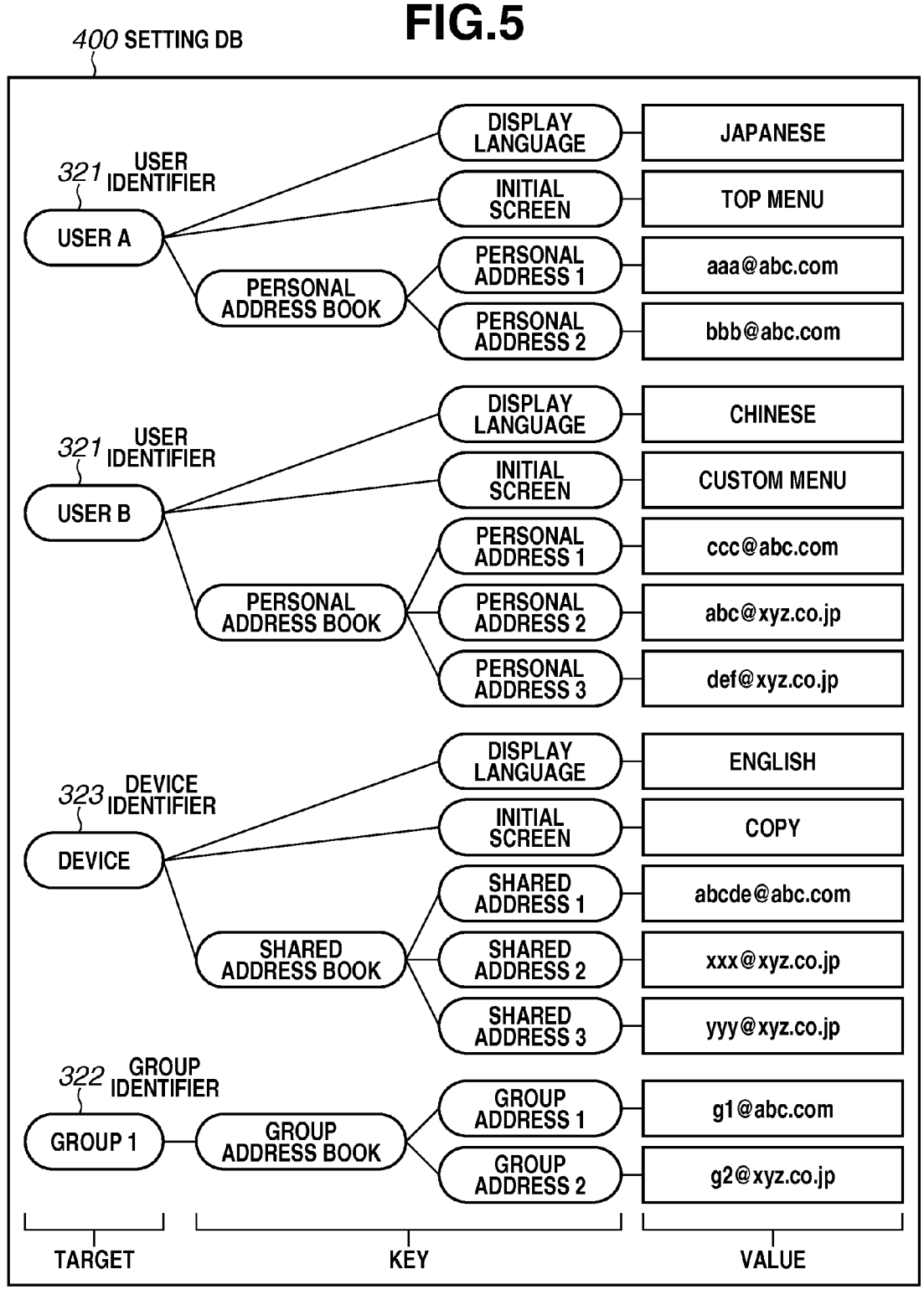
FIG. 5 illustrates a setting database (DB).

The setting value storage control unit 203 stores the shared setting information, the personal setting information, and the group setting information in the setting DB 400 on the external memory 120. FIG. 5 illustrates an example of the setting DB 400. The setting DB 400 includes setting information identification keys stores in combination with setting information values (i.e., setting values). The setting DB 400 has a hierarchical structure. The first hierarchy includes target information. The target includes information usable for identifying each of the shared setting information, the personal setting information, and the group setting information. Further, the target includes the user identifier 321 (i.e., the identifier that identifies each individual user) if it relates to the personal setting information and includes the group identifier 322 (i.e., the identifier that identifies each individual group) if it relates to the group setting information. According to the example illustrated in FIG. 5, information identifying a device is represented by "device." The user identifier 321 is represented by "user name." The group identifier 322 is represented by "group name." Each setting value can be determined based on a target-and-key combination.

According to the example illustrated in FIG. 5, a setting value corresponding to the key "display language" of the target "user A" is "Japanese." A setting value corresponding to the key "display language" of the target "user B" is "Chinese." As another example, a setting value corresponding to the key "personal address book—personal address 1" of the target "user B" is "ccc@abc.com." The personal setting information is stored for each user. On the other hand, the shared setting information provided for the MFP 101 is only one. According to the example illustrated in FIG. 5, a setting value corresponding to the key "device—display language" is "English." Further, a setting value corresponding to the key "group address book—group address 1" of the target "group 1" is "g1@abc.com." For example, it is assumed that the user A and the user B belong to the group 1. In this case, both of the user A and the user B can refer to the group address 1. However, a user C who does not belong to the group 1 cannot refer to the group address 1.

The personal setting information and the shared setting information included in the setting DB 400 may have the same key or may not have the same key. In a case where the personal setting information and the shared setting information have the same key, setting values of the shared setting information can be regarded as initial values at the time when the setting values of the personal setting information are not yet registered. According to the example illustrated in FIG. 5, it is assumed that the personal setting information for the user C is not yet registered. In this case, the shared setting value "English" can be used as the setting value of the display language information for the user C.

Further, in a case where the personal setting information and the shared setting information do not have the same key, it is regarded that the personal setting information is not yet registered (or the number of registrations=0). For example, the key "personal address book" is a key whose target is limited to setting information about an "individual person" (although the address book is described in detail below). On the other hand, the key "shared address book" is a key whose target is limited to setting information about a "device." According to the example illustrated in FIG. 5, there is not any personal address book for the user C. However, the setting DB 400 includes the shared setting information. Therefore, the user C can refer to a shared address 1, a shared address 2, and a shared address 3 in the shared address book.

In a login operation, the setting value storage control unit 203 reads the personal setting values from the setting DB 400 and reflects the read personal setting values to the setting information owned by the MFP 101. Therefore, each user can use the MFP 101 customized according to the setting values of the personal setting information registered according to preference. Further, in a logout operation, the setting value storage control unit 203 reads the shared setting values from the setting DB 400 and reflects the read shared setting values to the setting information owned by the MFP 101. Therefore, the user can use any function usable in the non-login state with device-common setting values.

The setting information includes initial display screen setting information, screen color inversion setting information, keyboard setting information, key repeat setting information, audio setting information, and mm/inch switching setting information. Each user can customize the above-mentioned personal setting information. Further, other setting information held by the MFP 101 can be a target to be customized.

The screen color inversion setting information includes information indicating whether to inversely display black and white colors. For example, according to the screen color inversion setting information, the setting value storage control unit 203 "does not invert" the screen color in the login state of the user A and "inverts" the screen color in the login state of the user B.

The initial display screen setting information includes information about a screen to be initially displayed after the login operation. For example, according to the initial display screen setting information, the setting value storage control unit 203 displays a "copy screen" as an initial display screen in the login state of the user A, and displays a "transmission screen" as the initial display screen in the login state of the user B. The copy function and the transmission function will be described in detail below.

The keyboard setting information includes information that can be referred to in order to change the keyboard layout. The setting value storage control unit 203 can change the layout of character (or mark) to be allocated to each key of the keyboard according to the keyboard setting information. For example, according to the keyboard setting information, the setting value storage control unit 203 sets the keyboard layout to a "Japanese keyboard layout" in the login state of the user A and sets the keyboard layout to a "Chinese keyboard layout" in the login state of the user B.

The key repeat setting information includes information about time required to shift into a long-press mode. The operation mode is shiftable into the long-press mode when a button on the keyboard is continuously pressed for a predetermined time. For example, in the long-press mode, in the MFP 101, the same character can be continuously input or the shift lock can be activated. For example, according to the key repeat setting information, the setting value storage control unit 203 sets a key repeat setting value "one second" for the long-press mode in the login state of the user A and sets a key repeat setting value "three seconds" for the long-press mode in the login state of the user B.

The audio setting information includes various kinds of information required to use an audio function. The audio function is composed of an audio key operation function and an audio vocalization operation function. The audio key operation function can generate an audio guidance that enables a user to know the contents required to operate the MFP 101. The audio key operation function can output the audio guidance from a speaker via an audio control I/F. The audio vocalization operation function can analyze the vocalization by a user instead of analyzing an operating on the touch panel 118 and acquire a user input based on a recognized keyword. The audio vocalization operation function can cause an audio analysis unit to analyze an audio signal input from a microphone via the audio control I/F and acquire a user input based on a recognized keyword. Setting information about the audio function includes ON/OFF setting information about launching of the audio function in a login operation, switching setting information about selection between male voice and female voice in an audio guide, volume setting information about audio guide sounds, and speed setting information about the audio guide. Further, the setting information of the audio function includes time-out setting information about the time required for analyzing audio vocalization and ON/OFF setting information about the display of an execution confirmation dialog in a vocalization operation. For example, in the login state of the user A, the setting value storage control unit 203 sets "launch the audio mode in login operation", "speed: fastest", "male voice", and "sound volume: maximum" according to the setting information about the audio function. Further, in the login state of the user B, the setting value storage control unit 203 sets "do not launch the audio mode in login operation" according to the setting information about the audio function. The mm/inch switching setting information includes information indicating switching between "mm display" and "inch display." For example, according to the mm/inch switching setting information, the setting value storage control unit 203 selects the "mm display" setting in the login state of the user A and selects the "inch display" setting in the login state of the user B.

Next, a user mode control unit 204 will be described in detail below. The user mode control unit 204 has a function of registering and changing the setting values of the shared setting information and the personal setting information (hereinafter, referred to as "user mode"). The user mode control unit 204 displays a setting change screen that enables a user to change each of the shared setting values.

If a user inputs a value change instruction on the setting change screen thereof, the user mode control unit 204 sends target shared setting information and related values to the setting value storage control unit 203. The setting value storage control unit 203 changes the values of the setting DB 400 based on the received information.

Further, an item that can be set by a user having special authority may be included as a part of the items having settings changeable in the user mode. For example, if a user has administrative authority for the MFP 101, the user can change both of the shared setting information and the personal setting information. If a user has general user authority, the user can change only the personal setting information. If desired, it is feasible to set a plurality of special authorities for the MFP 101.

Next, the synchronization control unit 205 will be described in detail below. The synchronization control unit 205 can perform a control to synchronize the setting information managed by the setting value storage control unit 203 with that of a setting server 1000.

Figure 6:
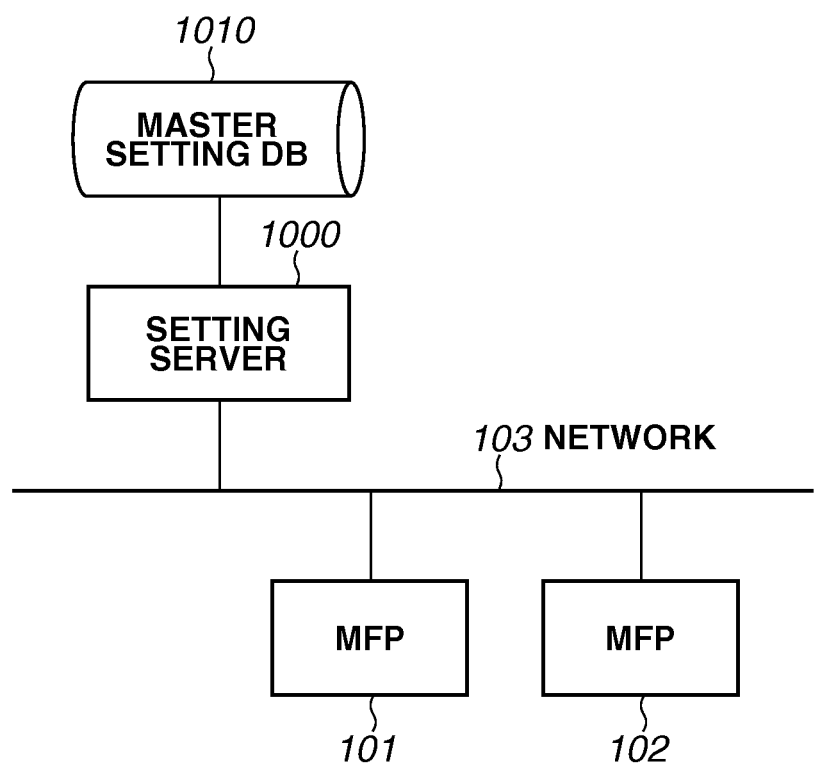
FIG. 6 illustrates an example of a system configuration of an image forming system.

FIG. 6 illustrates an example of a configuration of the image forming system that includes the setting server 1000, the MFP 101, and an additional MFP 102.

The MFP 101 and the MFP 102 are connected to the setting server 1000 via the network 103. It is assumed that the MFP 102 has a configuration comparable to that of the MFP 101. The system configuration illustrated in FIG. 6 is a mere example according to the present exemplary embodiment and can include any other configuration element. Further, the MFP 101 or the MFP 102 can be configured to have the functions of the setting server 1000.

The setting server 1000 is associated with a master setting DB 1010. The master setting DB 1010 is usable for the management of setting information.

The synchronization control unit 205 communicates with the setting server 1000 via the communication I/F controller 117 and performs a control to synchronize the setting information stored in the setting DB 400 with the setting information stored in the master setting DB 1010 of the setting server 1000.

If a setting information change by a user occurs in the MFP 101, the changed setting information can be notified from the MFP 101 to the setting server 1000. The MFP 102 inquires of the setting server 1000 about any change in the setting information and, if there is a change in the setting information, the MFP 102 acquires the changed setting information from the setting server 1000. Thus, the change content of the setting information in the MFP 101 can be reflected to the MFP 102. Similarly, if a setting information change occurs in the MFP 102, the changed setting information can be synchronized with that of the MFP 101 via the setting server 1000.

Next, a sequence of the processing that can be performed by the MFP 101 to synchronize with the setting server 1000 in response to a change of the setting information will be described in detail below with reference to FIG. 7. The change of the setting information includes registration, editing, and deletion of the setting information. The user mode control unit 204 can change the setting information according to a user instruction. However, instead of using the user mode control unit 204, it is feasible to configure any one of the copy control unit 210, the transmission control unit 211, the custom menu control unit 212, and each Function control unit to have the capability of changing the setting information.

The user mode control unit 204 transmits a request for the following processing to each control unit.

If the user mode control unit 204 receives an instruction from a user, then in step S1100, the user mode control unit 204 requests the setting value storage control unit 203 to change the setting information. In step S1101, the setting value storage control unit 203 updates the setting DB 400. If the change of the setting information in step S1101 has been failed, the user mode control unit 204 can notify the user of the failure in the setting information change processing. The setting value storage control unit 203 requests the synchronization control unit 205 to notify the setting server 1000 of the changed content of the setting information. In response to the request from the setting value storage control unit 203, in step S1102, the synchronization control unit 205 notifies the setting server 1000 of the changed content of the setting information via the network 103. If the communication with the setting server 1000 in step S1102 has been failed, the setting value storage control unit 203 can retry the communication processing. In step S1103, the setting server 1000 reflects the notified change content of the setting information to the master setting DB 1010. In step S1104, the setting server 1000 notifies the MFP 101 of the processing result in step S1103 reflected to the master setting DB 1010. If an error notification is received in step S1104, the synchronization control unit 205 can retry the communication processing in step S1102. In step S1105, the user mode control unit 204 notifies the user of success in the setting information change processing.

Figure 8A:
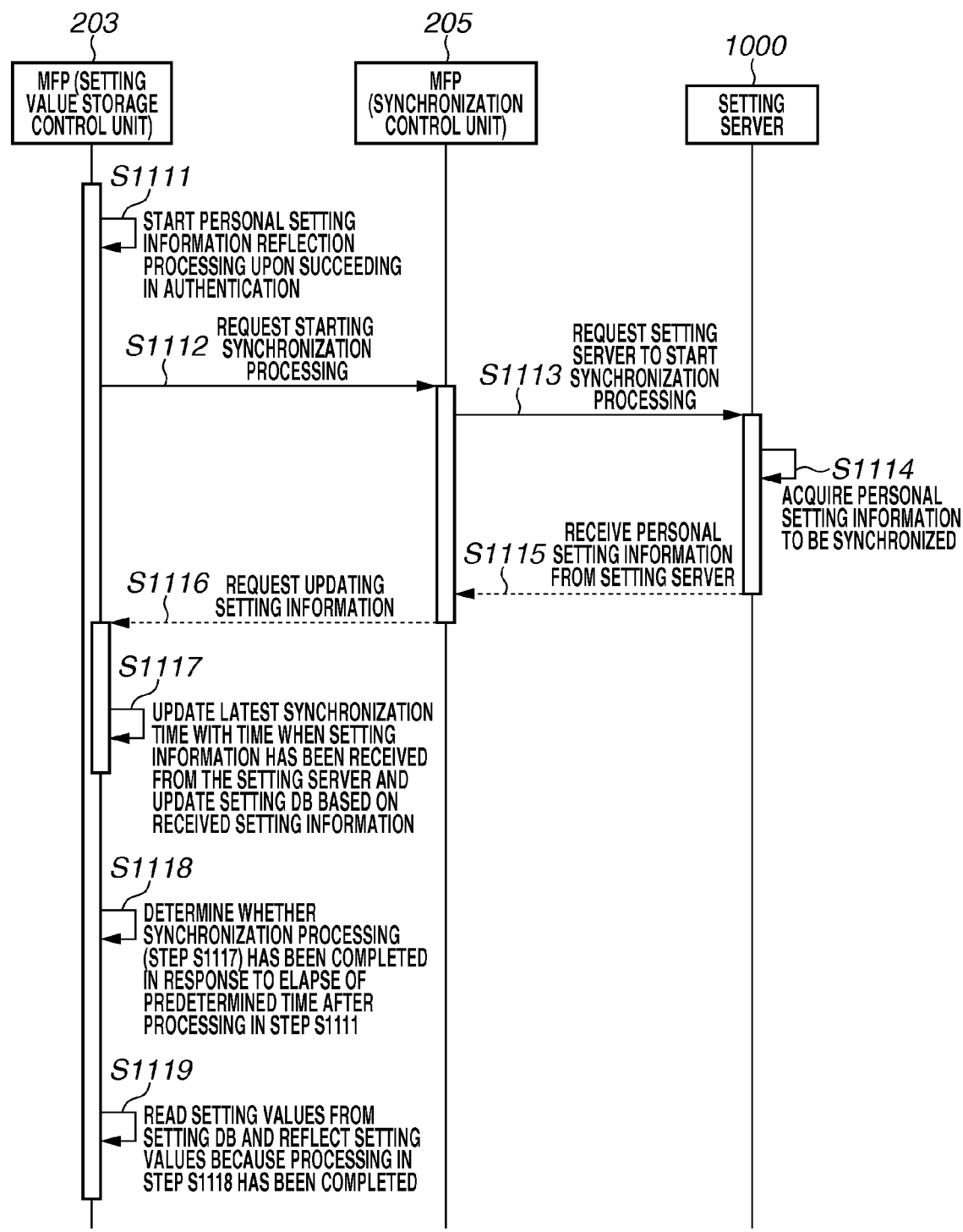
FIG. 8A is a sequence diagram illustrating processing in a case where synchronization processing has been completed within a predetermined time after starting of login processing.
Figure 8B:
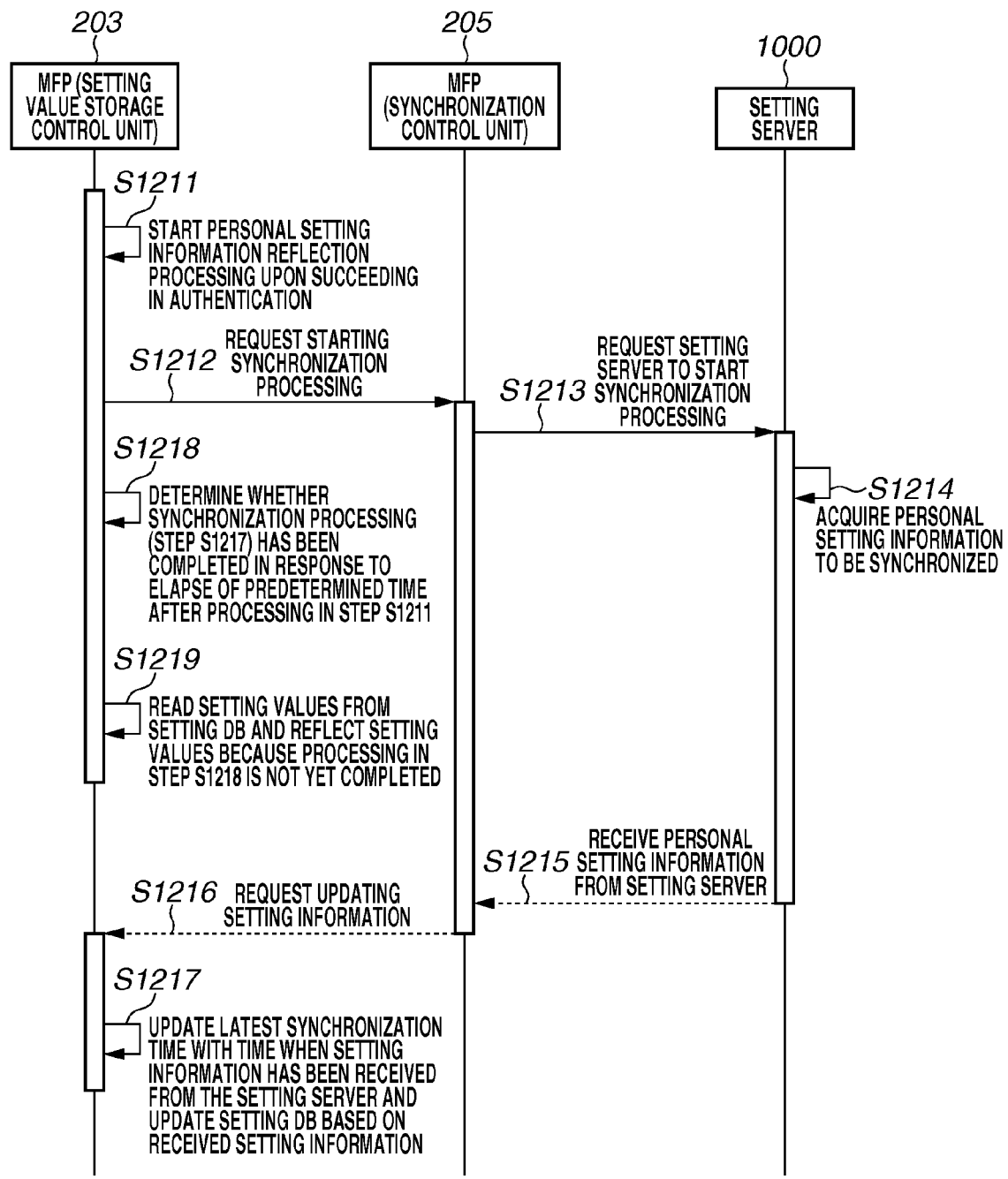
FIG. 8B is a sequence diagram illustrating processing in a case where the synchronization processing has not been completed within the predetermined time after starting of the login processing.

Next, a sequence of the processing that can be performed by the MFP 101 to synchronize with the setting server 1000 will be described in detail below. Each of FIGS. 8A and 8B illustrates a sequence of transmission and reception processing performed between a client (i.e., the MFP 101) and a server (i.e., the setting server 1000), as a part of the processing to be performed in step S315 illustrated in FIG. 3. The setting value storage control unit 203 transmits a request for the following processing to each control unit. The sequences illustrated in FIGS. 8A and 8B are similar to each other. FIG. 8A illustrates a processing sequence in a case where the time required to complete synchronization processing after starting login processing is within a predetermined time. FIG. 8B illustrates a processing sequence in a case where the synchronization processing has not been completed within the predetermined time. The predetermined time is an example of the setting time. More specifically, the predetermined time described below can be a preliminarily determined time or can be a time stored in the ROM 113 having been set by the CPU 111 according to a user operation via the touch panel 118.

In FIG. 8A, step S1111 indicates steps S310 to S315 illustrated in FIG. 3. In step S1111, the authentication control unit 202 performs authentication processing for user information input by a user in response to an authentication request from the user. If the authentication is successfully completed, the setting value storage control unit 203 performs login processing and starts personal setting information reflection processing.

In step S1112, the setting value storage control unit 203 requests the synchronization control unit 205 to start synchronization processing. In step S1113, the synchronization control unit 205 requests the setting server 1000 to start the synchronization processing based on the user information transmitted together. More specifically, if the request of the synchronization in step S1113 is the first time, the synchronization control unit 205 requests the setting server 1000 to perform the entire synchronization for the personal setting information. If the request of the synchronization in step S1113 is not the first time, the synchronization control unit 205 notifies the setting server 1000 of the latest synchronization time and requests the setting server 1000 to perform synchronization for the personal setting information having been changed after the latest synchronization time. In this case, the latest synchronization time indicates completion time of the previous synchronization request. If the synchronization control unit 205 fails in communicating with the setting server 1000, the synchronization control unit 205 can retry the processing in step S1113. If the synchronization processing is requested by the MFP 101, then in step S1114, the setting server 1000 acquires target setting information requested from the MFP 101 (i.e., partial personal setting information included in the received user information) from the master setting DB 1010. In this case, the target setting information is the whole personal setting information about a target user in a case where the entire synchronization for the setting information is requested in step S1113. Further, the target setting information is only the personal setting information about the target user having been changed after the latest synchronization time in a case where the partial synchronization is requested in step S1113. In step S1115, the synchronization control unit 205 receives the personal setting information from the setting server 1000. If the synchronization control unit 205 receives an error notification in step S1115, the synchronization control unit 205 can retry the processing in step S1113.

In step S1116, the synchronization control unit 205 requests the setting value storage control unit 203 to update the setting DB 400 based on the setting information received in step S1115. In step S1117, the setting value storage control unit 203 updates the latest synchronization time being presently managed with the time when the setting information has been received from the setting server 1000 and updates the setting DB 400 based on the received setting information. The timing updated in step S1117 is synchronization completed timing.

Processing in step S1118 is performed in parallel with the processing in steps S1112 to S1117. More specifically, the synchronization control unit 205 determines whether the synchronization processing (see step S1117) has been completed at the time when a predetermined time has elapsed after the login processing in step S1111. In step S1119, the setting value storage control unit 203 reads the setting values from the setting DB 400 and reflects the setting values to the setting information owned by the MFP 101. At the timing of step S1119, the setting values received from the setting server 1000 are stored in the setting DB 400. Therefore, the personal setting values of the setting server 1000 can be reflected to the setting information owned by the MFP 101.

The processing to be performed in step S1118 is an example of processing for determining whether personal setting information about a user has been acquired from a server apparatus.

In FIG. 8B, step S1211 indicates steps S310 to S315 illustrated in FIG. 3. In step S1211, the authentication control unit 202 performs authentication processing for user information input by a user in response to an authentication request from the user. If the authentication is successfully completed, the setting value storage control unit 203 performs login processing and starts personal setting information reflection processing.

In step S1212, the setting value storage control unit 203 requests the synchronization control unit 205 to start synchronization processing. In step S1213, the synchronization control unit 205 requests the setting server 1000 to start the synchronization processing based on the user information transmitted together. More specifically, if the request of the synchronization in step S1213 is the first time, the synchronization control unit 205 requests the setting server 1000 to perform the entire synchronization for the personal setting information. If the request of the synchronization in step S1213 is not the first time, the synchronization control unit 205 notifies the setting server 1000 of the latest synchronization time and requests the setting server 1000 to perform synchronization for the personal setting information having been changed after the latest synchronization time. The latest synchronization time indicates completion time of the previous synchronization request. If the synchronization control unit 205 fails in communicating with the setting server 1000, the synchronization control unit 205 can retry the processing in step S1213.

If the synchronization processing is requested by the MFP 101, then in step S1214, the setting server 1000 acquires target setting information requested from the MFP 101 (i.e., partial personal setting information included in the received user information) from the master setting DB 1010. The target setting information is the whole personal setting information about a target user in a case where the entire synchronization for the setting information is requested in step S1213. Further, the target setting information is only the personal setting information about the target user having been changed after the latest synchronization time in a case where the partial synchronization is requested in step S1213.

In step S1215, the synchronization control unit 205 receives the personal setting information from the setting server 1000. If the synchronization control unit 205 receives an error notification in step S1215, the synchronization control unit 205 can retry the processing in step S1213.

In step S1216, the synchronization control unit 205 requests the setting value storage control unit 203 to update the setting DB 400 based on the setting information received in step S1215. In step S1217, the setting value storage control unit 203 updates the latest synchronization time being presently managed with the time when the setting information has been received from the setting server 1000 and updates the setting DB 400 based on the received setting information. The timing updated in step S1217 is synchronization completed timing.

Processing in step S1218 is performed in parallel with the processing in steps S1212 to S1217. More specifically, the synchronization control unit 205 determines whether the synchronization processing (see step S1217) has been completed at the time when a predetermined time has elapsed after the login processing in step S1211. In step S1219, the setting value storage control unit 203 reads the setting values from the setting DB 400 and reflects the setting values to the setting information owned by the MFP 101. At the timing of step S1219, the synchronization is not yet completed. Therefore, previous setting values stored in the setting DB 400 before the synchronization (instead of the setting values received from the setting server 1000) are reflected to the setting information owned by the MFP 101.

The previous setting values stored in the setting DB 400 before the synchronization are setting values of setting information stored in the MFP 101 before the login processing.

The setting value storage control unit 203 can be configured to change the timing to request the synchronization control unit 205 to start the synchronization processing (in step S1112 illustrated in FIG. 8A or step S1212 illustrated in FIG. 8B). For example, the setting value storage control unit 203 can perform setting in such a way as to start the synchronization processing at a logout time according to an operation mode, at designated timing, or when a predetermined time has elapsed, or when designated date and time has come, or in response to a designation by a user.

Further, the setting value storage control unit 203 can perform processing according to the sequence illustrated in FIG. 8A or FIG. 8B according to an operation mode, for a part or the whole of the personal setting values, without making a determination at the time when the predetermined time has elapsed after the login processing (see step S1118 or step S1218). Then, in a case where the setting value storage control unit 203 performs processing according the sequence illustrated in FIG. 8B, the setting value storage control unit 203 can be configured to perform the synchronization processing for a user who has performed a login operation again. Further, the setting value storage control unit 203 can be configured to read the setting values stored in the setting DB 400 and reflect the read setting values to the setting information owned by the MFP 101.

FIG. 9 is a flowchart illustrating details of the information processing to be performed in step S1119 illustrated in FIG. 8A and in step S1219 illustrated in FIG. 8B. The setting value storage control unit 203 transmits a request for the following processing to each control unit.

The information in the external memory 120, which can be stored by the setting value storage control unit 203, includes a personal setting key list (i.e., a list of personal setting keys). The personal setting key indicates a name or an ID that can uniquely identify personal setting information. In step S410, the setting value storage control unit 203 determines whether all of setting values corresponding to the personal setting keys included in the personal setting key list have been acquired. If it is determined that there is at least one setting value that is not acquired (No in step S410), then in step S411, the setting value storage control unit 203 receives the user identifier 321 issued in step S314 from the authentication control unit 202 and acquires personal setting values of a corresponding user from the setting DB 400. If it is determined that the personal setting value corresponding to the personal setting key is not present in the setting DB 400 (No in step S412), then in step S413, the setting value storage control unit 203 acquires the shared setting value corresponding to the personal setting key and regards the acquired shared setting value as substitutive value of the personal setting value. In step S414, the setting value storage control unit 203 sends the acquired personal setting values to each control unit and requests each control unit to change the processing. Subsequently, the operation returns to step S410. The setting value storage control unit 203 determines whether all of the setting values corresponding to the personal setting keys described in the personal setting key list has been completely processed, and if it is determined that all the setting values has been completely processed (Yes in step S410), the setting value storage control unit 203 terminates the processing of the flowchart illustrated in FIG. 9.

Figure 10:
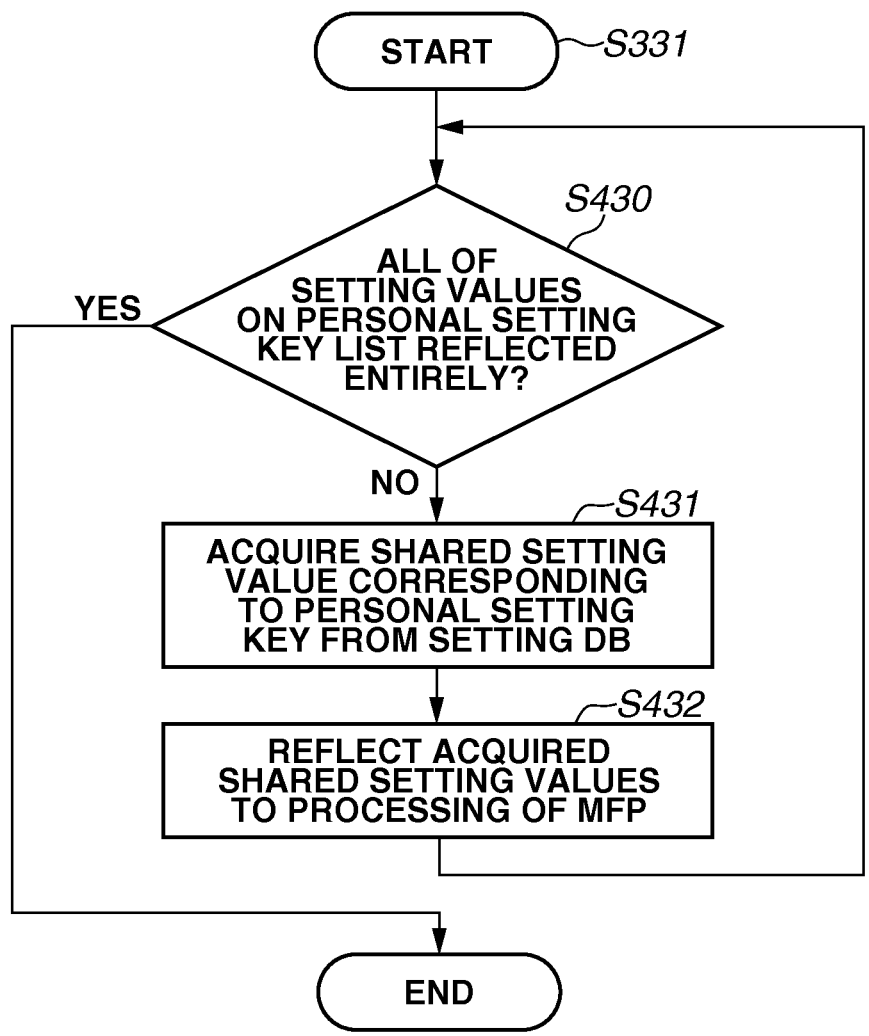
FIG. 10 is a flowchart illustrating details of processing to be performed in step S331 illustrated in FIG. 4.

FIG. 10 is a flowchart illustrating details of the processing to be performed in step S331 illustrated in FIG. 4, which is performed by the setting value storage control unit 203 that controls the reflection of shared setting values. The setting value storage control unit 203 transmits a request for the following processing to each control unit.

In step S430, the setting value storage control unit 203 determines whether all of the setting values have been acquired with reference to the personal setting key list. If it is determined that there is at least one setting that is not acquired (No in step S430), then in step S431, the setting value storage control unit 203 acquires the shared setting values from the setting DB 400. In step S432, the setting value storage control unit 203 sends the acquired shared setting values to each control unit and requests each control unit to change the processing. Then, the operation returns to step S430. The setting value storage control unit 203 determines whether all of the setting values corresponding to the keys described in the personal setting key list have been completely processed. If it is determined that the setting value processing has been entirely completed (Yes in step S430), the setting value storage control unit 203 terminates the processing of the flowchart illustrated in FIG. 10.

The setting value storage control unit 203 can be configured to change the timing to reflect the setting values according to a mode in the flowchart illustrated in FIG. 9 or FIG. 10. For example, the setting value storage control unit 203 can perform setting in such a way as to reflect the setting values at a logout time, at designated timing, or when a predetermined time has elapsed, or when designated date and time has come, or in response to a designation by a user.

Next, processing for initially connecting the MFP 101 and the MFP 102 to the setting server 1000 will be described in detail below. Each of the MFP 101 and the MFP 102 is operable in an independent mode using an independently differentiated personal environment and is also operable in a synchronization mode using the personal setting values synchronized with the setting server 1000. Hereinafter, processing that can be performed before starting the synchronization with the setting server 1000 in a state where the MFP 101 and the MFP 102 use the independently differentiated personal environments will be described in detail below.

First, if the MFP 101 is independently operating, the MFP 101 uploads the personal setting values to the setting server 1000 because the personal setting values owned by the MFP 101 are directly used even after the mode is changed to the synchronization mode.

When the mode is changed in such a way as to synchronize the MFP 101 with the setting server 1000, the MFP 101 uploads, to the setting server 1000, information relating to the personal setting values included in the setting DB 400. The setting server 1000 updates the master setting DB 1010 based on the uploaded information. The operation of a target to be uploaded can be switched according to some modes.

For example, in the MFP 101, it is assumed that users A, B, and E are presently using their personal environments. Further, in the MFP 102, it is assumed that users C, D, and E are presently using their personal environments. First, if the initial connection starts with the MFP 101, the personal setting information about the user A, the personal setting information about the user B, and the personal setting information about the user E are uploaded to the setting server 1000 in this order. Subsequently, if the initial connection for the MFP 102 follows, the personal setting information about the user C, the personal setting information about the user D, and the personal setting information about the user E are uploaded to the setting server 1000 in this order. However, at the timing of the initial connection for the MFP 101, the uploading of the personal setting information about the user E to the setting server 1000 is already completed. Therefore, the image forming system can prevent the personal setting values for the user E from being uploaded from the MFP 102 to the setting server 1000. Further, the setting server 1000 can prioritize the upload of the one whose timing is later depending on a selected operation mode, in such a way as to first upload the personal setting values for the user E from the MFP 102. Further, the setting server 1000 can provide a mode to merge and upload the personal setting values for the user E. Further, instead of uploading the personal setting values, the MFP 101 can delete all of the personal setting values owned by the MFP 101 according to a selected operation mode and can start the synchronization processing while regarding the personal setting values of the setting server 1000 as master data.

Figure 11:
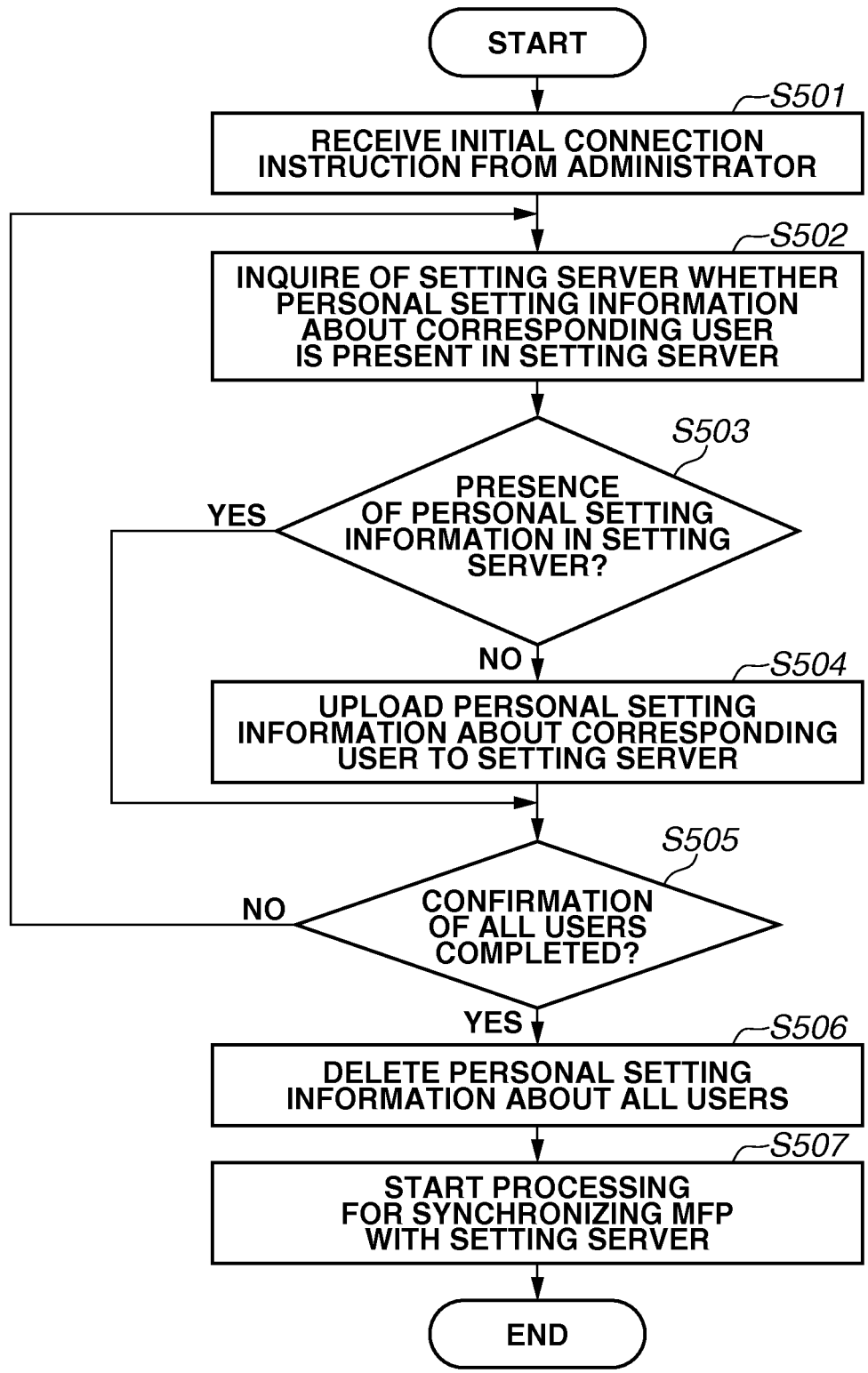
FIG. 11 is a flowchart illustrating an example of initial connection related information processing.

The above-mentioned initial connection will be described in detail below with reference to a flowchart illustrated in FIG. 11. The synchronization control unit 205 transmits a request for the following processing to each control unit.

In step S501, the synchronization control unit 205 receives an initial connection instruction (i.e., an instruction that causes the MFP 101 to start initial connection processing) from an administrator of the MFP 101. In step S502, the synchronization control unit 205 inquires of the setting server 1000 whether the personal setting information about a corresponding user is present in the setting server 1000. In step S503, the synchronization control unit 205 receives a presence confirmation result from the setting server 1000 and determines whether to perform upload processing. If it is determined that the personal setting information about the corresponding user is present in the setting server 1000 (Yes in step S503), the synchronization control unit 205 does not perform the upload processing. If it is determined that the personal setting information about the corresponding user is not present (No in step S503), then in step S504, the synchronization control unit 205 uploads the personal setting information about the corresponding user, to the setting server 1000. In step S505, the synchronization control unit 205 determines whether the upload processing has been entirely completed. If it is determined that the upload processing is not yet completed (No in step S505), the synchronization control unit 205 repeats the processing in steps S502 to S504 for the next user. If it is determined that the confirmation for all users has been completed (Yes in step S505), then in step S506, the setting value storage control unit 203 deletes the personal setting information about all users. After completing the deletion processing in step S506, namely in step S507, the synchronization control unit 205 starts processing for synchronizing the MFP 101 with the setting server 1000.

As the synchronization processing is started in step S507, the personal setting information about the corresponding user can be synchronized at the user login timing as mentioned above. Alternatively, the synchronization control unit 205 can perform the synchronization processing according to an all-user synchronization processing mode after completing the processing of step S507.

Each of the copy control unit 210, the transmission control unit 211, and the custom menu control unit 212 will be described in detail below.

First, the copy control unit 210 will be described in detail below. The copy control unit 210 can control the function of reading a paper document and printing a copied document (hereinafter, referred to as "copy function"). More specifically, the copy control unit 210 reads image data supplied from the scanner 121 and an image processing control unit performs image processing on the read image data. The image data having been subjected to the image processing is then output to the printer 122.

For example, the copy function setting includes layout (N in 1) setting for designating whether to generate one piece of copy image from N pieces of original documents or two-sided setting for designating whether to read one side or two sides of an original document. Further, as another example, the copy function setting includes color mode setting for designating print color (e.g., full color, monochrome, or single color). The above-mentioned setting items relating to the copy function can be referred to as job setting information. Further, initial values initially set on a copy job setting screen that designates the job setting information relating to the copy function can be referred to as default job setting values.

If a user gives an instruction to register default job setting values on the copy job setting screen, the user mode control unit 204 registers the setting values in the setting DB 400. In this case, it is assumed that the registration instruction by the user includes designating whether to register the default job setting values as shared setting values or personal setting values. In a case where the personal setting values are already registered in the setting DB 400, the copy control unit 210 reads the default job setting values of the personal setting information and displays the read default job setting values on the copy job setting screen. Further, in a case where the personal setting values are not registered in the setting DB 400, the copy control unit 210 reads the default job setting values of the shared setting information and displays the read default job setting values on the copy job setting screen.

Further, the MFP 101 can set default job setting values for any Function other than the copy function.

Further, the copy function includes a function of storing job setting information history when a user implements the copy function and reading job setting information from the stored history (hereinafter, referred to as "call function"). The call function can store a plurality of pieces of job setting information, although the upper limit of storable histories is three. Each time a user implements the copy function, the copy control unit 210 stores the latest history, the second latest history, and the third latest history together with the job setting information in the setting DB 400 and deletes the older history that exceeds the upper limit.

Further, when a user implements the copy function, the copy control unit 210 stores the job setting information history as shared setting values that can be referred to by all users and stores the job setting information history as personal setting values that can be referred to by a corresponding user only. The copy control unit 210 can be configured to store the job setting information history as shared setting values as well as personal setting values or can be configured to store the job setting information history as shared setting values or personal setting values according to a selected mode.

Further, the MFP 101 can store the job setting information history not only for the copy function but also for another Function. The MFP 101 can store history data for each Function or can store history data common to all Functions.

Next, the transmission control unit 211 will be described in detail below. The transmission control unit 211 can control a function of reading a paper document and transmitting the read document data to an external server (hereinafter, referred to as "transmission function"). The transmission control unit 211 can read image data via the scanner 121 and cause the image processing control unit to perform image processing on the read image data. For example, the transmission control unit 211 can generate a file having a general file format (e.g., JPEG or TIFF) through the above-mentioned image processing. Further, the transmission control unit 211 can transmit the generated file to a server. For example, the transmission control unit 211 can transmit an e-mail including the generated file.

The transmission function includes an address book function of registering an address of each transmission destination beforehand. The address book function can be classified into the shared address book, the personal address book, and the group address book according to its use. The shared address book can be commonly used by all users and is stored, as shared setting values, in the setting DB 400. The personal address book can be used by a corresponding user only and is stored, as personal setting values, in the setting DB 400. The group address book can be used by users belonging to a corresponding group and is stored, as group setting values, in the setting DB 400. Each of the shared address book, the personal address book, and the group address book includes a plurality of address lists. The MFP 101 can register a plurality of addresses in each address list.

Next, the custom menu control unit 212 will be described in detail below. The custom menu control unit 212 can control a function of storing settings of another Functions and registering customizable buttons (hereinafter, referred to as "custom menu function"). If the custom menu control unit 212 completes the setting of another Function, the custom menu control unit 212 registers a shortcut button corresponding to the newly set Function on a custom menu screen according to a button registration instruction. For example, it is assumed that the settings on the transmission screen controlled by the transmission control unit 211 include E-Mail address "aaa@abcd.co.jp" as transmission setting, "full color" as color mode setting, and resolution "200 dpi" as reading setting. If a user gives an instruction to register a shortcut button, the custom menu control unit 212 newly registers a shortcut button corresponding to the above-mentioned settings. Further, in the above-mentioned shortcut button registration, the user can change the name of the button to, for example, "person in charge of client aaa." If the user presses the "person in charge of client aaa" button on the custom menu screen, the custom menu control unit 212 reads the registered setting information and requests the transmission control unit 211 to display the transmission screen based on the read setting information.

Further, the custom menu function can be classified into a shared button, a personal button, and a group button according to its use. The shared button is a shortcut button that can be commonly used by all users and is stored, as shared setting values, in the setting DB 400. The personal button is a shortcut button that can be used by a corresponding user only and is stored, as personal setting values, in the setting DB 400. The group button is a shortcut button that can be used by users belonging to a corresponding group and is stored, as group setting values, in the setting DB 400. The MFP 101 can register a plurality of shortcut buttons as the shared button, the personal button, or the group button.

As mentioned above, according to the above-mentioned exemplary embodiment, it is feasible to cause the MFP to perform operations based on setting values being set according to user preference at the login timing. Further, by synchronizing with the setting server, it becomes feasible to realize a personal environment operable with the same setting values in a plurality of environments. Further, by switching the setting value reflection timing depending on the time required to complete the synchronization processing, it becomes feasible for a user to use the personal environment without waiting for the completion of the synchronization processing.

A second exemplary embodiment will be described in detail below.

Figure 12:
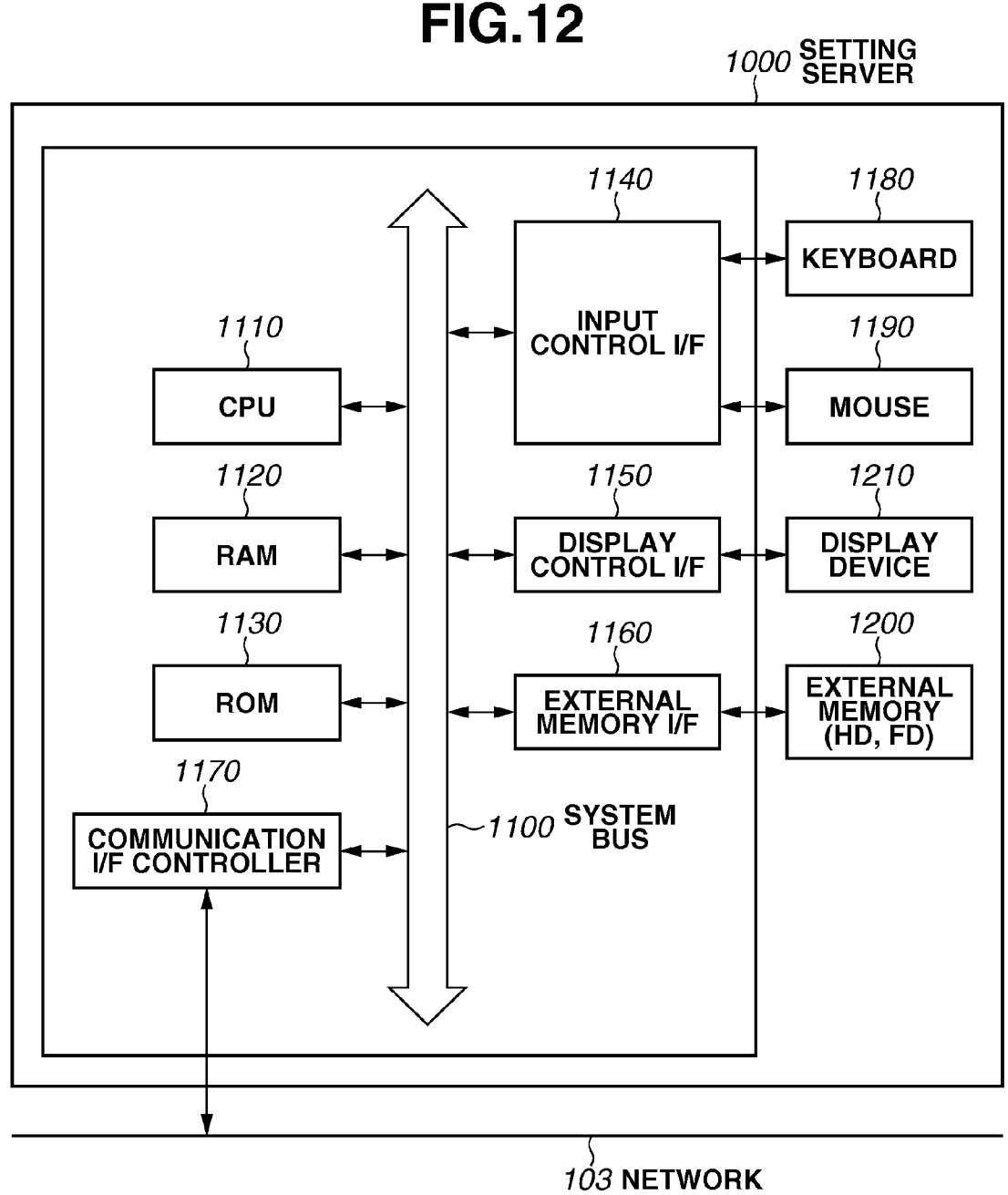
FIG. 12 illustrates an example of the hardware configuration of the setting server.

FIG. 12 illustrates an example of the hardware configuration of the setting server 1000. A CPU 1110, a RAM 1120, a ROM 1130, an input control I/F 1140, a display control I/F 1150, an external memory I/F 1160, and a communication I/F controller 1170 are connected to a system bus 1100. Respective units connected to the system bus 1100 are constituted in such a way as to mutually transmit and receive data via the system bus 1100.

The CPU 1110 can control various operations to be performed by the setting server 1000 and can perform data calculation and modification processing.

The RAM 1120 is a volatile memory that can be used as a main memory or a temporary storage area (e.g., a work area) for the CPU 1110.

The ROM 1130 is a nonvolatile memory that includes predetermined areas capable of storing image data and other data, and various programs that cause the CPU 1110 to perform various operations.

For example, the CPU 1110 controls the remaining units of the MFP 101 according to the programs stored in the ROM 1130 while using the RAM 1120 as a work memory. The programs causing the CPU 1110 to perform various operations can be stored not only in the ROM 1130 but also in an external memory 1200.

The input control I/F 1140 can accept a user operation, generates a control signal according to the user operation, and supply the generated control signal to the CPU 1110. According to the present exemplary embodiment, the input control I/F 1140 includes a keyboard 1180 and a mouse 1190 that cooperatively serve as an input device capable of accepting user operations.

The CPU 1110 controls respective units of the MFP 101 according to the programs, based on the control signals generated and supplied from the input control I/F 1140, in response to user operations detected via the input device. Thus, the CPU 1110 can cause the MFP 101 to perform various operations according to user operations.

The display control I/F 1150 can output a display signal that causes a display device 1210 to display an image. For example, the CPU 1110 supplies a display control signal generated according to a related program, to the display control I/F 1150. The display control I/F 1150 generates a display signal based on the display control signal and outputs the generated display signal to the display device 1210. For example, the display control I/F 1150 causes the display device 1210 to display a GUI screen that constitutes a GUI based on the display control signal generated by the CPU 1110.

The external memory 1200 (e.g., a HDD, a flash memory, or a memory card) is attachable to the external memory I/F 1160. Under the control of the CPU 1110, the external memory I/F 1160 can read data from the attached external memory 1200 or can write data into the external memory 1200. If desirable, the ROM 1130 can be replaced by the external memory 1200.

The communication I/F controller 1170 can communicate with external devices via a LAN, the internet, or any other appropriate wired or wireless network, under the control of the CPU 1110. For example, a PC, another MFP, a printer, a server or any other device, which is connected to the network 103, can communicate with the setting server 1000.

When the CPU 1110 performs processing based on the programs stored in the ROM 1130 or the external memory 1200, functions of the setting server 1000 and processing to be performed by the setting server 1000 according to flowcharts described in detail below can be realized.

Figure 13:
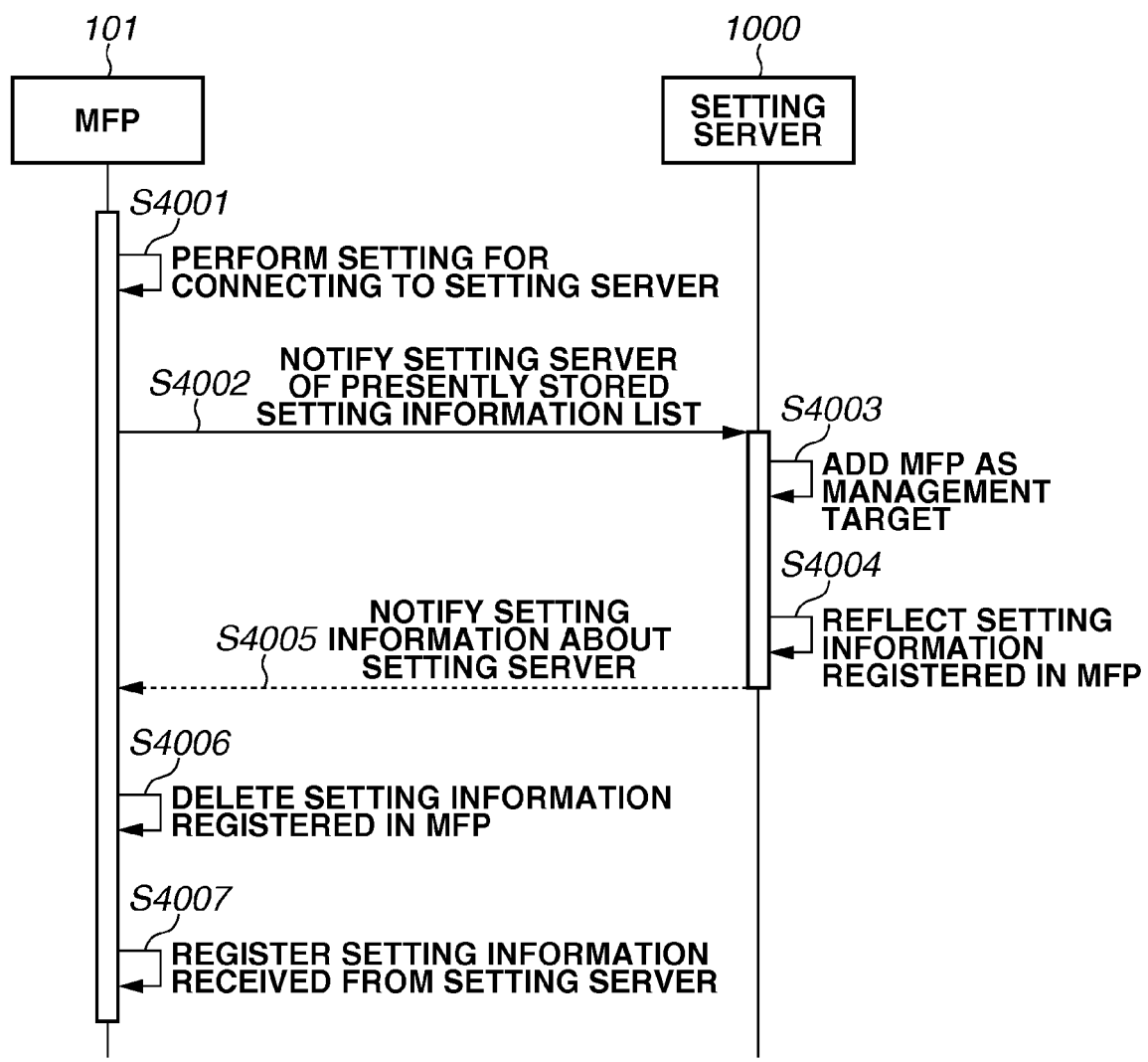
FIG. 13 is a sequence diagram illustrating information processing for reflecting setting information (part I).

FIG. 13 is a sequence diagram illustrating an example of the information processing for adding the MFP 101 as a management target of the setting server 1000 and setting the MFP 101 and the setting server 1000 in such a way as to perform a cooperative operation.

In step S4001, the MFP 101 performs setting for connecting to the setting server 1000. In the connection setting, a user sets information (e.g., IP address) about the setting server 1000 via a touch panel display device. The setting information is stored in the MFP 101.

In step S4002, the MFP 101 communicates with the setting server 1000 based on the information about the setting server 1000 having been set in step S4001. In this case, the MFP 101 notifies the setting server 1000 of the setting information presently registered in the MFP 101.

In step S4003, the setting server 1000 adds the MFP 101 as a management target of the setting server 1000.

In step S4004, the setting server 1000 reflects each setting value that is not stored in the setting server 1000 to the setting information owned by the setting server 1000 based on the setting information received from the MFP 101.

In step S4005, the setting server 1000 notifies the MFP 101 of the setting information about the setting server 1000.

In step S4006, the MFP 101 deletes the setting information presently registered in the MFP 101. In step S4007, the MFP 101 registers the setting information about the setting server 1000 received from the setting server 1000 as the setting information about the MFP 101.

Figure 14:
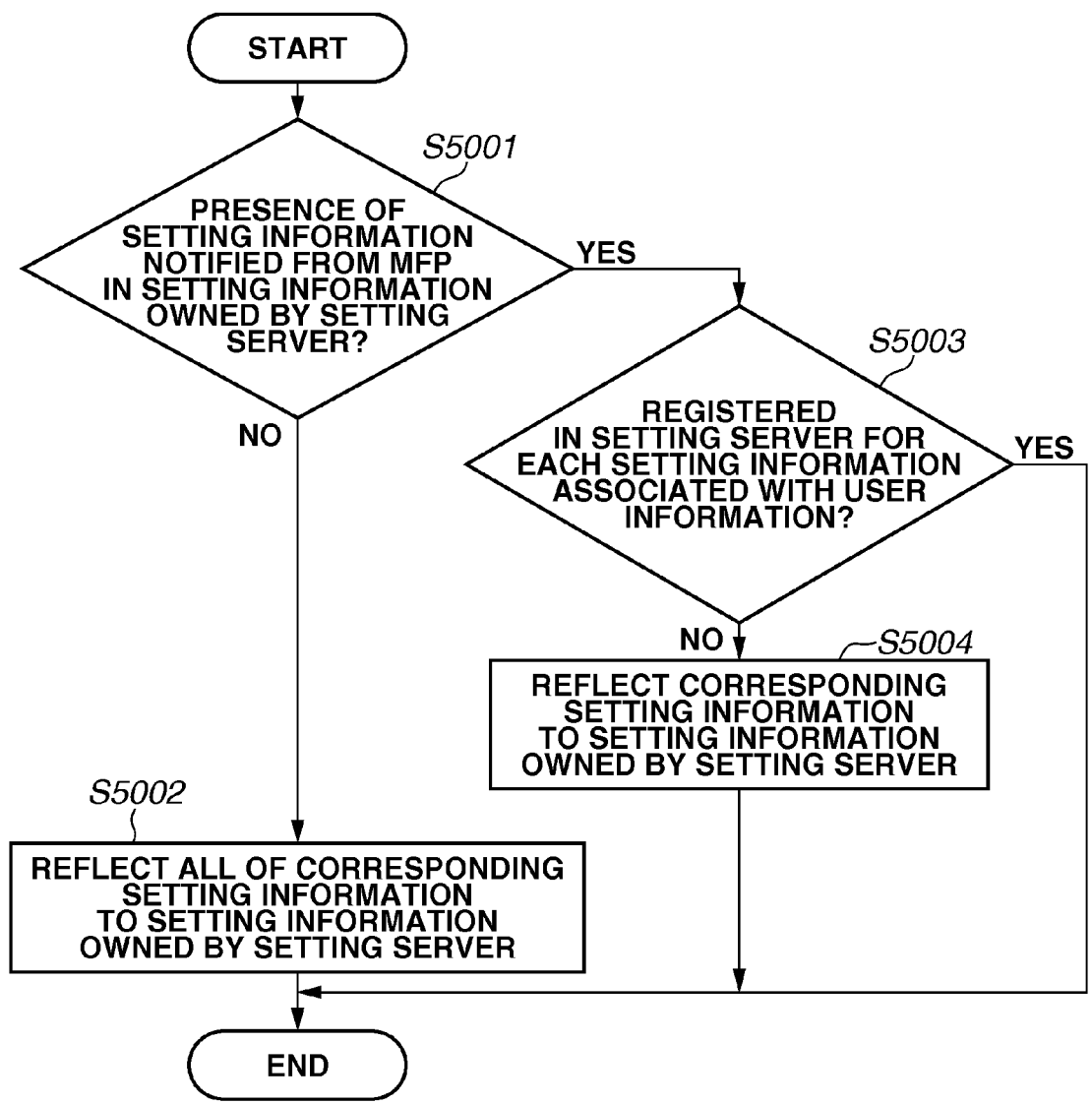
FIG. 14 is a flowchart illustrating details of processing to be performed in step S4004 illustrated in FIG. 13.

FIG. 14 is a flowchart illustrating details of the processing to be performed in step S4004, namely the processing to be performed when the setting server 1000 receives each piece of setting information from the MFP 101.

In step S5001, the CPU 1110 checks user information included in the setting information notified from the MFP 101. If the CPU 1110 determines that the setting information about a user identified by the user information is not present in the setting server 1000 (No in step S5001), the operation proceeds to step S5002. If the CPU 1110 confirms the presence of the setting information about the user identified by the user information (Yes in step S5001), the operation proceeds to step S5003. In step S5002, the CPU 1110 reflects all of the setting information associated with the user information to the setting information owned by the setting server 1000.

In step S5003, the CPU 1110 confirms whether the notified setting information is registered in the setting server 1000 for each piece of setting information associated with the user information. If the CPU 1110 determines that the notified setting information is not registered in the above-mentioned manner (No in step S5003), the operation proceeds to step S5004. If it is determined that the notified setting information is registered as mentioned above (Yes in step S5003), the CPU 1110 terminates the processing of the flowchart illustrated in FIG. 14.

In step S5004, the CPU 1110 reflects the corresponding setting information to the setting information owned by the setting server 1000.

If the above-mentioned processing in step S5001 and subsequent steps has been completed for all pieces of setting information notified from the MFP 101, the CPU 1110 terminates the processing of the flowchart illustrated in FIG. 14.

FIG. 15 illustrates examples of the setting information. Setting information 6001 includes individual setting information about the users A, B, and C, which has been registered in the setting server 1000 before the MFP 101 and the setting server 1000 start a cooperative operation. Setting information 6002 includes individual setting information about the users A, B, and D, which has been registered in the MFP 101 before the MFP 101 and the setting server 1000 start the cooperative operation.

If the MFP 101 and the setting server 1000 start the cooperative operation, then in step S4002, the MFP 101 notifies the setting server 1000 of the individual setting information about the users A, B, and D stored in the MFP 101. Further, in step S5001, the setting server 1000 identifies the setting information about the user D as a reflection target. Then, in step S5002, the setting server 1000 reflects the setting information about the user D to the entire setting information owned by the setting server 1000.

Further, the setting information owned by the MFP 101 includes print setting information about the user A. On the other hand, the setting information owned by the setting server 1000 does not include the print setting information about the user A. Therefore, in step S5003, the setting server 1000 identifies the print setting information about the user A as a reflection target. Then, in step S5004, the setting server 1000 reflects the print setting information about the user A to the setting information about the user A owned by the setting server 1000.

Through the above-mentioned processing, the entire setting information owned by the setting server 1000 is changed to setting information 6003. Subsequently, after the MFP 101 and the setting server 1000 start the cooperative operation through steps S4005, S4006, and S4007, the setting information owned by the MFP 101 is changed to setting information 6004.

Although "user", "display language", "initial screen", and "print settings" are examples of the setting information in the present exemplary embodiment, the target to be restricted is not limited to the above-mentioned setting information.

A third exemplary embodiment will be described in detail below. Only the differences between the third exemplary embodiment and the second exemplary embodiment will be described in detail below.

In the third exemplary embodiment, the setting information includes the latest update date and time of each setting information.

Figure 16:
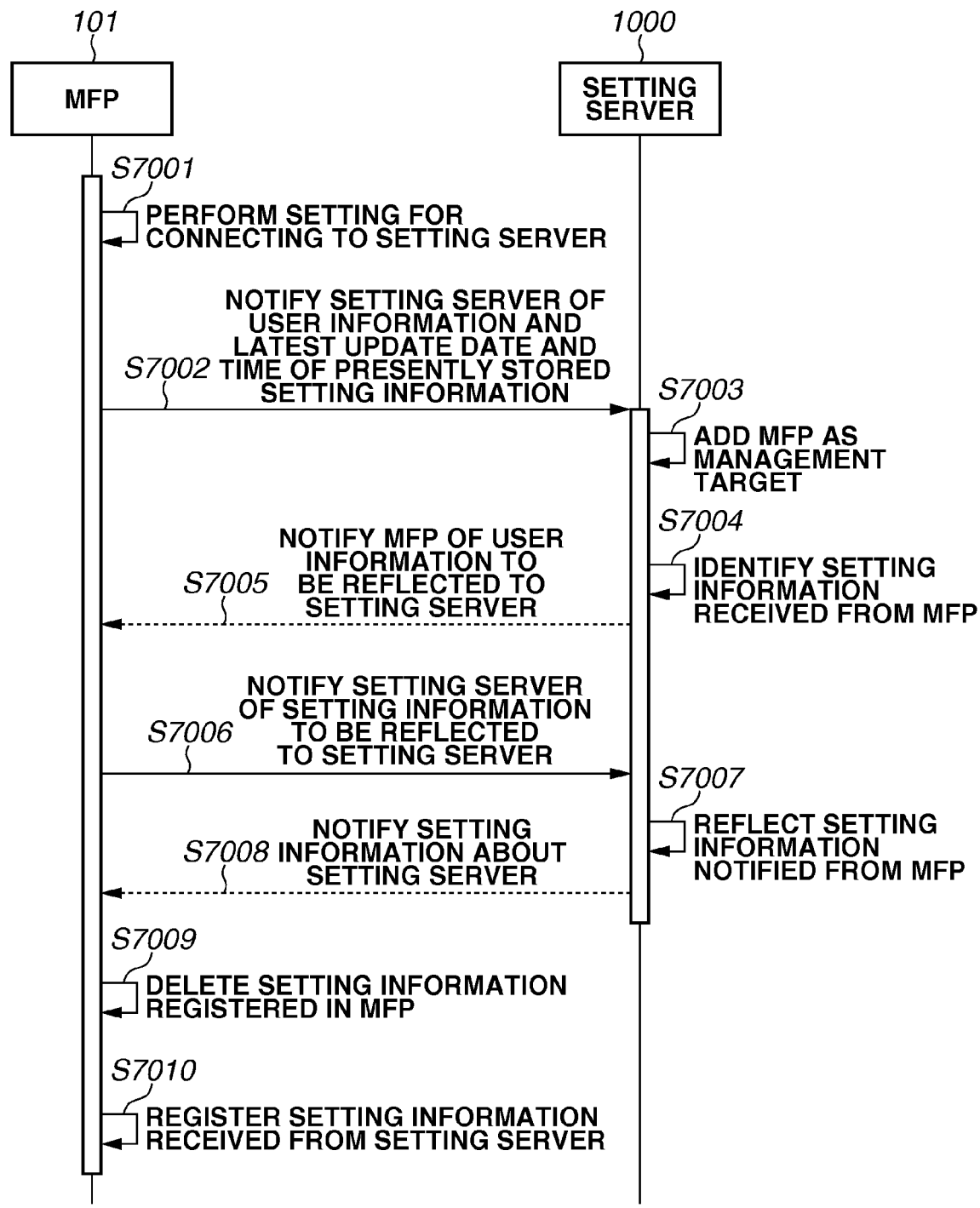
FIG. 16 is a sequence diagram illustrating information processing for reflecting setting information (part II).

FIG. 16 is a sequence diagram illustrating an example of the information processing for adding the MFP 101 according to the third exemplary embodiment as a management target of the setting server 1000 and setting the MFP 101 and the setting server 1000 in such a way as to perform the cooperative operation.

Step S7001 is similar to step S4001 in that the MFP 101 performs setting for connecting to the setting server 1000.

In step S7002, the MFP 101 notifies the setting server 1000 of user information included in the setting information about the MFP 101 in addition to the latest update date and time of the setting associated with the user information.

Step S7003 is similar to step S4003 in that the setting server 1000 adds the MFP 101 as a management target of the setting server 1000.

In step S7004, the setting server 1000 identifies setting information to be reflected to the setting server 1000 from the setting information included in the MFP 101, based on the user information received from the MFP 101 and the latest update date and time of the setting associated with the user information.

In step S7005, the setting server 1000 notifies the MFP 101 of the user information to be reflected to the setting server 1000 based on the information identified in step S7004.

In step S7006, the MFP 101 notifies the setting server 1000 of setting information of a user identified by the user information received from the setting server 1000.

In step S7007, the setting server 1000 reflects the setting information notified from the MFP 101 to the setting information owned by the setting server 1000.

Step S7008 is similar to step S4005 in that the setting server 1000 notifies the MFP 101 of the setting information about the setting server 1000.

Step S7009 is similar to step S4006 in that the MFP 101 deletes the setting information presently registered in the MFP 101.

Step S7100 is similar to step S4007 in that the MFP 101 registers the setting information about the setting server 1000 received from the setting server 1000 as the setting information about the MFP 101.

Figure 17:
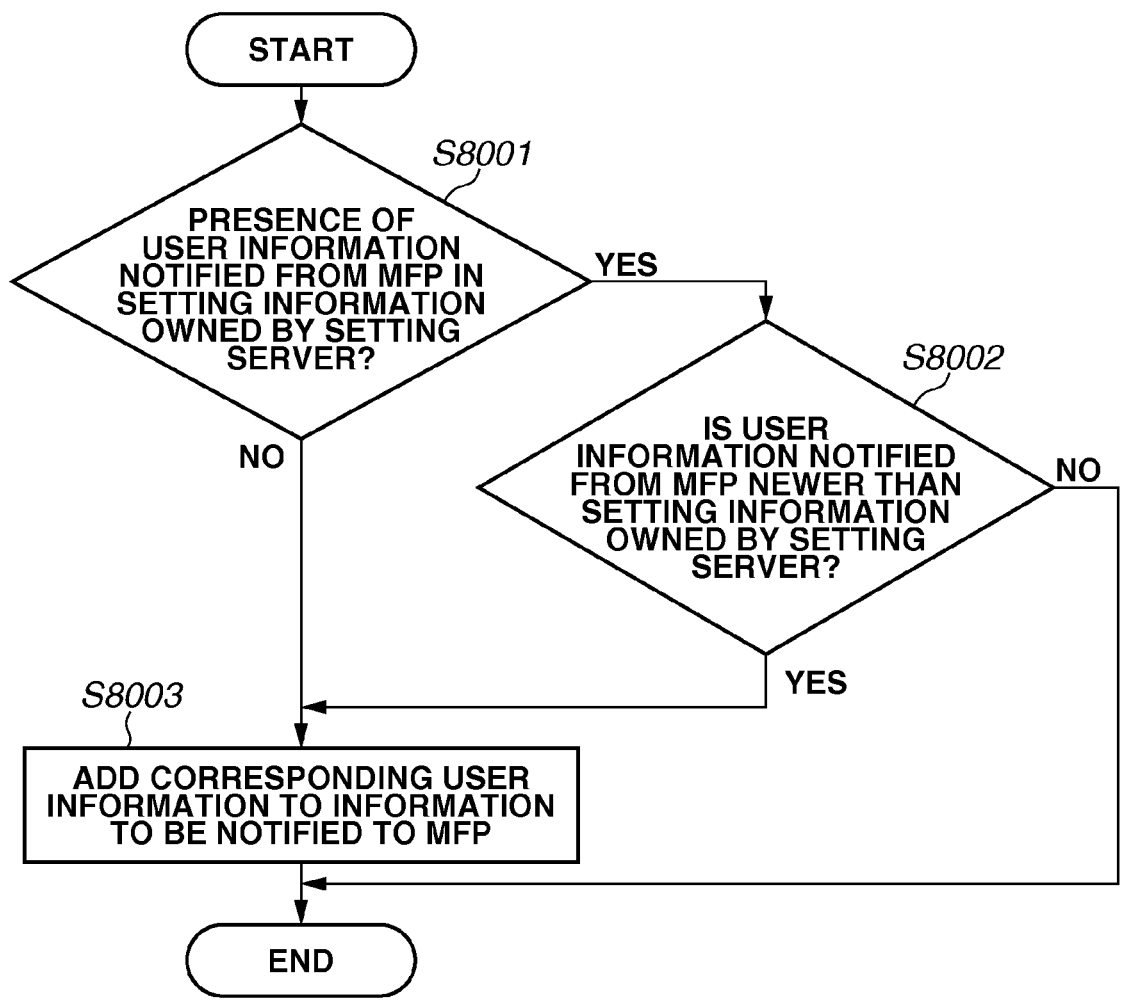
FIG. 17 is a flowchart illustrating details of processing to be performed in step S7004 illustrated in FIG. 16.

FIG. 17 is a flowchart illustrating details of the processing to be performed in step S7004, namely the processing to be performed when the setting server 1000 receives each piece of user information from the MFP 101 in step S7002.

In step S8001, the CPU 1110 confirms whether the user information notified from the MFP 101 is present in the setting information owned by the setting server 1000. If the CPU 1110 determines that the user information notified from the MFP 101 is present in the setting information owned by the setting server 1000 (Yes in step S8001), the operation proceeds to step S8002. If the CPU 1110 determines that the user information notified from the MFP 101 is not present in the setting information owned by the setting server 1000 (No in step S8001), the operation proceeds to step S8003.

In step S8002, the CPU 1110 confirms whether the user information notified from the MFP 101 is newer than the user information owned by the setting server 1000. If the CPU 1110 determines that the user information notified from the MFP 101 is newer than the user information owned by the setting server 1000 (Yes in step S8002), the operation proceeds to step S8003. If it is determined that the user information notified from the MFP 101 is older than the user information owned by the setting server 1000 (No in step S8002), the CPU 1110 does not perform any processing and terminates the processing of the flowchart illustrated in FIG. 17.

In step S8003, the CPU 1110 adds the corresponding user information to the user information to be notified to the MFP 101 in step S7005.

FIG. 18 illustrates examples of the setting information according to the third exemplary embodiment. In the following description, it is assumed that each of the MFP 101 and the MFP 102 has setting information beforehand while the setting server 1000 has no setting information when they are connected to each other. In this case, the MFP 102 and the MFP 101 are similar to each other in configuration.

However, the MFP 101 and the MFP 102 are differentiated in setting information. Further, it is assumed that the MFP 101 is first connected to the setting server 1000 and the MFP 102 is later connected to the setting server 1000 as described in detail below.

Setting information 9001 is owned by the MFP 101, which includes individual setting information about the users A, B, and C. Further, setting information 9002 is owned by the MFP 102, which includes individual setting information about the users A, B, and D.

If the MFP 101 and the setting server 1000 start the cooperative operation, the setting information about the MFP 101 is entirely reflected to the setting information owned by the setting server 1000 through steps S7001 to S7100 because the setting server 1000 does not have any setting information. Thus, the setting information owned by the setting server 1000 is changed to setting information 9003.

Subsequently, if the MFP 102 and the setting server 1000 start the cooperative operation, then in step S7002, the MFP 102 notifies the setting server 1000 of the information about the users A, B, and D as user information together with the latest update date and time of the users A, B, and D as the latest update date and time.

Further, in step S8001, the CPU 1110 identifies the user D as a reflection target because the user information notified from the MFP 102 does not include any setting information about the user D.

Further, the setting information about the user A owned by the MFP 102 is newer than the corresponding setting information owned by the setting server 1000. Therefore, in step S8002, the CPU 1110 identifies the setting information about the user A as a reflection target.

In step S8003, the CPU 1110 sets the users A and D as user information to be notified to the MFP 102. Then, in step S7005, the setting server 1000 notifies the MFP 102 of individual information about the users A and D as user information.

In step S7006, the MFP 102 notifies the setting server 1000 of individual setting information about the users A and D as setting information.

In step S7007, the setting server 1000 reflects the individual setting information about the users A and D to the entire setting information owned by the setting server 1000. As a result of the above-mentioned reflection, the entire setting information owned by the setting server 1000 is changed to setting information 9004.

Subsequently, after the MFP 102 and the setting server 1000 start the cooperative operation through steps S7008, S7009, and S7100, the entire setting information being set in the MFP 102 is changed to the setting information 9004 (i.e., the setting information owned by the setting server 1000).

As mentioned above, in the present exemplary embodiment, the personal setting information (or personal setting values) owned by the MFP that is new in the latest update date and time can be managed by the setting server 1000 as user's personal setting information (or personal setting values). However, the setting server 1000 can be configured to manage the personal setting information (or personal setting values) owned by the MFP that is frequently used by a user as user's personal setting information (or personal setting values).

A fourth exemplary embodiment will be described in detail below.

Processing according to the fourth exemplary embodiment is similar to the processing according to the third exemplary embodiment although there is a difference in that the latest update date and time information is not used.

FIG. 19 is a sequence diagram illustrating processing for adding the MFP 101 according to the fourth exemplary embodiment as a management target of the setting server 1000 and setting the MFP 101 and the setting server 1000 in such a way as to perform a cooperative operation.

Step S2001 is similar to step S7001 (or step S4001) in that the MFP 101 performs setting for connecting to the setting server 1000.

In step S2002, the MFP 101 notifies the setting server 1000 of user information included in the setting information about the MFP 101.

Step S2003 is similar to step S7003 (or step S4003) in that the setting server 1000 adds the MFP 101 as a management target of the setting server 1000.

In step S2004, the setting server 1000 identifies user information that is not included in the setting server 1000, which is a part of the setting information included in the MFP 101, from the user information having been received from the MFP 101. Further, the setting server 1000 designates the identified user information as a target to be registered in the setting server 1000.

In step S2005, the setting server 1000 notifies the MFP 101 of the user information being designated as the registration target in step S2004.

In step S2006, the MFP 101 notifies the setting server 1000 of setting information about a user identified by the user information received from the setting server 1000.

Step S2007 is similar to step S7007 (or step S4004) in that the setting server 1000 reflects the setting information notified from the MFP 101 to the setting information owned by the setting server 1000.

Step S2008 is similar to step S7008 (or step S4005) in that the setting server 1000 notifies the MFP 101 of the setting information about the setting server 1000.

Step S2009 is similar to step S7009 (or step S4006) in that the MFP 101 deletes the setting information presently registered in the MFP 101.

Step S2010 is similar to step S7100 (or step S4007) in that the MFP 101 registers the setting information about the setting server 1000 received from the setting server 1000 as the setting information about the MFP 101.

As mentioned above, according to the above-mentioned each exemplary embodiment, it is feasible to reflect the personal setting values without giving a user a sense of discomfort.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-129576, filed Jun. 24, 2014, which is hereby incorporated by reference herein in its entirety.

What is claimed is:

1. An image forming apparatus capable of communicating with a server apparatus, the image forming apparatus comprising:
a memory device that stores a set of instructions; and
at least one processor that executes the instructions to:
input user information for identifying a user;
obtain, from the server apparatus, personal setting information corresponding to the inputted user information;
display, in a case where first personal setting information of a first type has been obtained from the server apparatus within a predetermined time corresponding to the first personal setting information, an operation screen by using the obtained first personal setting information;
display, in a case where the first personal setting information has not been obtained from the server apparatus within the predetermined time, an operation screen by using cache information corresponding to the inputted user information, the cache information being stored in the image forming apparatus before an obtaining of the personal setting information; and
display, without depending on whether the predetermined time has elapsed to obtain second personal setting information of a second type from the server apparatus, an operation screen by using the obtained second personal setting information.

2. The image forming apparatus according to claim 1, wherein the first personal setting information is information relating to display language.

3. The image forming apparatus according to claim 1, wherein the instructions further comprise instructions to:
notify the server apparatus of a synchronization time indicating a time when the personal setting information about a logged in user has been synchronized between the image forming apparatus and the server apparatus,
wherein at least one of the first personal setting information and the second personal setting information is information updated by the server apparatus at time later than a latest notified synchronization time.

4. The image forming apparatus according to claim 1, wherein the instructions further comprise instructions to:
inquire of the server apparatus whether personal setting information about a corresponding user is present in the server apparatus under at least a condition that an instruction to connect to the server apparatus is received, and upload the personal setting information about the user to the server apparatus if a result of the inquiry indicates that the personal setting information about the user is not present in the server apparatus.

5. The image forming apparatus according to claim 1, wherein the first or second personal setting information is information of a screen to be displayed initially after login processing.

6. The image forming apparatus according to claim 1, further comprising a printer that prints an image on a sheet, wherein the first or second personal setting information is information relating to a print setting performed by the printer.

7. The image forming apparatus according to claim 1, wherein the first personal setting information obtained from the server apparatus after a laps of the predetermined time, is stored in the image forming apparatus as the cache information.

8. A method for controlling an image forming apparatus capable of communicating with a server apparatus, the method comprising:

inputting user information, into the image forming apparatus, for identifying a user;

obtaining, from the server apparatus, personal setting information corresponding to the inputted user information;

displaying, in a case where first personal setting information of a first type has been obtained from the server apparatus within a predetermined time corresponding to the first personal setting information, an operation screen by using the obtained first personal setting information;

displaying, in a case where the first personal setting information has not been obtained from the server apparatus within the predetermined time, an operation screen by using cache information corresponding to the inputted user information, the cache information being stored in the image forming apparatus before an obtaining of the personal setting information; and displaying, without depending on whether the predetermined time has elapsed to obtain second personal setting information of a second type from the server apparatus, an operation screen by using the obtained second personal setting information.

9. A non-transitory computer-readable storage medium storing computer executable instructions that cause at least one processor of an image processing apparatus to execute a method for controlling an image forming apparatus capable of communicating with a server apparatus, the method comprising:

inputting user information, into the image forming apparatus, for identifying a user;

obtaining, from the server apparatus, personal setting information corresponding to the inputted user information;

displaying, in a case where first personal setting information of a first type has been obtained from the server apparatus within a predetermined time corresponding to the first personal setting information, an operation screen by using the obtained first personal setting information;

displaying, in a case where the first personal setting information has not been obtained from the server apparatus within the predetermined time, an operation screen by using cache information corresponding to the inputted user information, the cache information being stored in the image forming apparatus before an obtaining of the personal setting information; and displaying, without depending on whether the predetermined time has elapsed to obtain second personal setting information of a second type from the server apparatus, an operation screen by using the obtained second personal setting information.

10. An image forming apparatus capable of communicating with a server apparatus, the image forming apparatus comprising:

a memory device that stores a set of instructions; and
at least one processor that executes the instructions to:
input user information for identifying a user;
notify the server apparatus of a synchronization time indicating a time when personal setting information about a user identified by the inputted user information has been synchronized between the image forming apparatus and the server apparatus;

obtain, from the server apparatus, personal setting information corresponding to the inputted user information;

display, in a case where first personal setting information has been obtained from the server apparatus within a predetermined time corresponding to the first personal setting information, an operation screen by using the obtained first personal setting information;

display, in a case where the first personal setting information has not been obtained from the server apparatus within the predetermined time, an operation screen by using cache information corresponding to the inputted user information, the cache information being stored in the image forming apparatus before an obtaining of the personal setting information, wherein the first personal setting information is information updated by the server apparatus at time later than a latest notified synchronization time.

11. A method for controlling an image forming apparatus capable of communicating with a server apparatus, the method comprising:

inputting user information for identifying a user;

notifying the server apparatus of a synchronization time indicating a time when personal setting information about a user identified by the inputted user information has been synchronized between the image forming apparatus and the server apparatus;

obtaining, from the server apparatus, personal setting information corresponding to the inputted user information;

displaying, in a case where first personal setting information has been obtained from the server apparatus within a predetermined time corresponding to the first personal setting information, an operation screen by using the obtained first personal setting information; and displaying, in a case where the first personal setting information has not been obtained from the server apparatus within the predetermined time, an operation screen by using cache information corresponding to the inputted user information, the cache information being stored in the image forming apparatus before an obtaining of the personal setting information, wherein the first personal setting information is information updated by the server apparatus at time later than a latest notified synchronization time.

12. A non-transitory computer-readable storage medium storing computer executable instructions that cause at least one processor of an image processing apparatus to execute a method for controlling an image forming apparatus capable of communicating with a server apparatus, the method comprising:

inputting user information for identifying a user;

notifying the server apparatus of a synchronization time indicating a time when personal setting information about a user identified by the inputted user information has been synchronized between the image forming apparatus and the server apparatus;

obtaining, from the server apparatus, personal setting information corresponding to the inputted user information;

displaying, in a case where first personal setting information has been obtained from the server apparatus within a predetermined time corresponding to the first personal setting information, an operation screen by using the obtained first personal setting information; and displaying, in a case where the first personal setting information has not been obtained from the server apparatus within the predetermined time, an operation screen by using cache information corresponding to the inputted user information, the cache information being stored in the image forming apparatus before an obtaining of the personal setting information, wherein the first personal setting information is information updated by the server apparatus at time later than a latest notified synchronization time.

\* \* \* \* \*